United States Patent
Rosenberg

(10) Patent No.: US 10,222,961 B2
(45) Date of Patent: Mar. 5, 2019

(54) METHODS FOR ANALYZING DECISIONS MADE BY REAL-TIME COLLECTIVE INTELLIGENCE SYSTEMS

(71) Applicant: Unanimous A. I., Inc., San Francisco, CA (US)

(72) Inventor: Louis B. Rosenberg, San Luis Obispo, CA (US)

(73) Assignee: Unanimous A. I., Inc., San Francisco, CA (US)

( * ) Notice: Subject to any disclaimer, the term of this patent is extended or adjusted under 35 U.S.C. 154(b) by 273 days.

(21) Appl. No.: 15/241,340

(22) Filed: Aug. 19, 2016

(65) Prior Publication Data

US 2016/0357418 A1    Dec. 8, 2016

Related U.S. Application Data

(63) Continuation-in-part of application No. 15/199,990, filed on Jul. 1, 2016, and a continuation-in-part of
(Continued)

(51) Int. Cl.
*G06F 3/0484*    (2013.01)
*G06F 3/0481*    (2013.01)
(Continued)

(52) U.S. Cl.
CPC ........ *G06F 3/04845* (2013.01); *E21B 47/122* (2013.01); *E21B 47/18* (2013.01);
(Continued)

(58) Field of Classification Search
CPC ............. G06Q 10/101; G06Q 30/0203; G06Q 3/03543; G06Q 3/04812; G06Q 11/3452
See application file for complete search history.

(56) References Cited

U.S. PATENT DOCUMENTS

| | | | | |
|---|---|---|---|---|
| 5,236,199 A | * | 8/1993 | Thompson, Jr. | ........ H04H 20/38 |
| | | | | 348/14.05 |
| 5,400,248 A | * | 3/1995 | Chisholm | .............. G07C 13/00 |
| | | | | 235/386 |

(Continued)

FOREIGN PATENT DOCUMENTS

| | | |
|---|---|---|
| CA | 2414397 | 8/2003 |
| JP | 2010191533 | 9/2010 |

(Continued)

OTHER PUBLICATIONS

PCT; International Search Report and Written Opinion of the International Searching Authority for PCT/US2016/040600 dated Nov. 29, 2016 (20330-138857-WO).

(Continued)

*Primary Examiner* — Ryan F Pitaro
(74) *Attorney, Agent, or Firm* — Fitch, Even, Tabin & Flannery LLP

(57) ABSTRACT

Systems and methods for real-time collaborative computing and collective intelligence are disclosed. A collaborative application runs on a collaborative server connected to a plurality of computing devices. Collaborative sessions are run wherein a group of independent users, networked over the internet, collaboratively answer questions in real-time, thereby harnessing their collective intelligence. Methods are disclosed for assigning users to factions during a collaborative decision process, wherein the collaborative server repeatedly checks the input of each user with respect to a plurality of proposed answers and assigns the user to the faction associated with the answer the user is trying to select. Furthermore, user assessments are made based on a stored time-history of faction associations for that user during a decision period. Such assessments include, but are not limited to, determining which users were entrenched, which (Continued)

were flexible, and which were fickle, during the collective intelligence decision making process.

9 Claims, 17 Drawing Sheets

Related U.S. Application Data application No. PCT/US2016/040600, filed on Jul. 1, 2016, and a continuation-in-part of application No. 15/086,034, filed on Mar. 30, 2016, and a continuation-in-part of application No. 15/052,876, filed on Feb. 25, 2016, now Pat. No. 10,110,664, and a continuation-in-part of application No. 15/047,522, filed on Feb. 18, 2016, now Pat. No. 10,133,460, and a continuation-in-part of application No. 15/017,424, filed on Feb. 5, 2016, and a continuation-in-part of application No. 14/925,837, filed on Oct. 28, 2015, and a continuation-in-part of application No. 14/920,819, filed on Oct. 22, 2015, and a continuation-in-part of application No. PCT/US2015/056394, filed on Oct. 20, 2015, and a continuation-in-part of application No. 14/859,035, filed on Sep. 18, 2015, now Pat. No. 10,122,775, and a continuation-in-part of application No. 14/738,768, filed on Jun. 12, 2015, now Pat. No. 9,940,006, and a continuation-in-part of application No. PCT/US2015/035694, filed on Jun. 12, 2015, and a continuation-in-part of application No. 14/708,038, filed on May 8, 2015, and a continuation-in-part of application No. PCT/US2015/022594, filed on Mar. 25, 2015, and a continuation-in-part of application No. 14/668,970, filed on Mar. 25, 2015, now Pat. No. 9,959,028.

(60) Provisional application No. 62/207,234, filed on Aug. 19, 2015, provisional application No. 62/187,470, filed on Jul. 1, 2015, provisional application No. 62/140,032, filed on Mar. 30, 2015, provisional application No. 62/120,618, filed on Feb. 25, 2015, provisional application No. 62/117,808, filed on Feb. 18, 2015, provisional application No. 62/113,393, filed on Feb. 7, 2015, provisional application No. 62/069,360, filed on Oct. 28, 2014, provisional application No. 62/067,505, filed on Oct. 23, 2014, provisional application No. 62/066,718, filed on Oct. 21, 2014, provisional application No. 62/012,403, filed on Jun. 15, 2014, provisional application No. 61/991,505, filed on May 10, 2014, provisional application No. 61/970,885, filed on Mar. 26, 2014.

(51) Int. Cl.
*G06F 3/0482* (2013.01)
*G06N 5/02* (2006.01)
*E21B 47/12* (2012.01)
*E21B 47/18* (2012.01)
*H04L 29/08* (2006.01)

(52) U.S. Cl.
CPC ........ *G06F 3/0482* (2013.01); *G06F 3/04817* (2013.01); *G06F 3/04847* (2013.01); *G06N 5/02* (2013.01); *H04L 67/12* (2013.01); *H04L 67/14* (2013.01); *H04L 67/18* (2013.01); *H04L 67/22* (2013.01)

(56) References Cited

U.S. PATENT DOCUMENTS

| | | | | |
|---|---|---|---|---|
| 5,808,908 | A | 9/1998 | Ghahramani | |
| 6,064,978 | A | 5/2000 | Gardner | |
| 6,480,210 | B1 * | 11/2002 | Martino | G06F 17/30817 707/E17.028 |
| 7,031,842 | B1 * | 4/2006 | Musat | G01V 1/30 702/16 |
| 7,158,112 | B2 | 1/2007 | Rosenberg | |
| 7,489,979 | B2 | 2/2009 | Rosenberg | |
| 7,542,816 | B2 | 6/2009 | Rosenberg | |
| 7,562,117 | B2 | 7/2009 | Rosenberg | |
| 7,603,414 | B2 | 10/2009 | Rosenberg | |
| 7,831,928 | B1 * | 11/2010 | Rose | G06F 17/3089 715/733 |
| 7,917,148 | B2 | 3/2011 | Rosenberg | |
| 7,937,285 | B2 | 5/2011 | Goldberg | |
| 8,176,101 | B2 | 5/2012 | Rosenberg | |
| 8,589,488 | B2 | 11/2013 | Huston | |
| 8,745,104 | B1 | 6/2014 | Rosenberg | |
| 8,762,435 | B1 | 6/2014 | Rosenberg | |
| 2002/0042920 | A1 * | 4/2002 | Thomas | G06F 3/0481 725/87 |
| 2002/0171690 | A1 | 11/2002 | Fox | |
| 2003/0065604 | A1 | 4/2003 | Gatto | |
| 2003/0079218 | A1 * | 4/2003 | Goldberg | G06Q 10/10 725/13 |
| 2004/0210550 | A1 | 10/2004 | Williams | |
| 2005/0067493 | A1 * | 3/2005 | Urken | G06Q 10/10 235/386 |
| 2005/0168489 | A1 | 8/2005 | Ausbeck | |
| 2005/0218601 | A1 | 10/2005 | Capellan | |
| 2005/0261953 | A1 * | 11/2005 | Malek | G06Q 30/02 705/7.32 |
| 2006/0147890 | A1 | 7/2006 | Bradford | |
| 2006/0200401 | A1 | 9/2006 | Lisani | |
| 2006/0250357 | A1 | 11/2006 | Safai | |
| 2007/0039031 | A1 | 2/2007 | Cansler, Jr. | |
| 2007/0097150 | A1 | 5/2007 | Ivashin | |
| 2007/0099162 | A1 | 5/2007 | Sekhar | |
| 2007/0124503 | A1 | 5/2007 | Ramos | |
| 2007/0211050 | A1 | 9/2007 | Ohta | |
| 2007/0220100 | A1 | 9/2007 | Rosenberg | |
| 2008/0103877 | A1 | 5/2008 | Gerken | |
| 2009/0037355 | A1 | 2/2009 | Brave | |
| 2009/0063379 | A1 * | 3/2009 | Kelly | G06Q 10/00 706/46 |
| 2009/0063463 | A1 | 3/2009 | Turner | |
| 2009/0063991 | A1 * | 3/2009 | Baron | G06Q 10/10 715/751 |
| 2009/0063995 | A1 | 3/2009 | Baron | |
| 2009/0239205 | A1 | 9/2009 | Morgia | |
| 2009/0254836 | A1 | 10/2009 | Bajrach | |
| 2009/0287685 | A1 | 11/2009 | Charnock | |
| 2009/0325533 | A1 | 12/2009 | Lele | |
| 2010/0145715 | A1 * | 6/2010 | Cohen | G06Q 30/02 705/1.1 |
| 2010/0169144 | A1 | 7/2010 | Estill | |
| 2010/0174579 | A1 | 7/2010 | Hughes | |
| 2010/0299616 | A1 | 11/2010 | Chen | |
| 2011/0016137 | A1 | 1/2011 | Goroshevsky | |
| 2011/0080341 | A1 * | 4/2011 | Helmes | G06F 3/03543 345/163 |
| 2011/0087687 | A1 | 4/2011 | Immaneni | |
| 2011/0119048 | A1 * | 5/2011 | Shaw | G06F 17/279 704/9 |
| 2011/0141027 | A1 | 6/2011 | Ghassabian | |
| 2011/0166916 | A1 * | 7/2011 | Inbar | G06F 3/0481 705/14.4 |
| 2012/0005131 | A1 | 1/2012 | Horvitz | |
| 2012/0011006 | A1 * | 1/2012 | Schultz | G06Q 10/10 705/14.73 |
| 2012/0013489 | A1 | 1/2012 | Earl | |
| 2012/0079396 | A1 | 3/2012 | Neer | |
| 2012/0109883 | A1 | 5/2012 | Iordanov | |
| 2012/0191774 | A1 | 7/2012 | Bhaskaran | |

(56) References Cited

U.S. PATENT DOCUMENTS

| | | | |
|---|---|---|---|
| 2012/0290950 A1* | 11/2012 | Rapaport | H04L 51/32 |
| | | | 715/753 |
| 2013/0013248 A1* | 1/2013 | Brugler | G06F 11/3082 |
| | | | 702/130 |
| 2013/0041720 A1 | 2/2013 | Spires | |
| 2013/0097245 A1 | 4/2013 | Adarraga | |
| 2013/0160142 A1* | 6/2013 | Lai | G06F 21/6209 |
| | | | 726/28 |
| 2013/0171594 A1 | 7/2013 | Gorman | |
| 2013/0231595 A1 | 9/2013 | Zoss | |
| 2013/0298690 A1 | 11/2013 | Bond | |
| 2013/0311904 A1* | 11/2013 | Tien | G06Q 10/10 |
| | | | 715/753 |
| 2013/0339445 A1 | 12/2013 | Perincherry | |
| 2014/0057240 A1 | 2/2014 | Colby | |
| 2014/0100924 A1* | 4/2014 | Ingenito | G06Q 10/10 |
| | | | 705/12 |
| 2014/0108915 A1 | 4/2014 | Lu | |
| 2014/0128162 A1 | 5/2014 | Arafat | |
| 2014/0129946 A1 | 5/2014 | Harris | |
| 2014/0162241 A1 | 6/2014 | Morgia | |
| 2014/0249889 A1 | 9/2014 | Park | |
| 2014/0258970 A1 | 9/2014 | Brown | |
| 2014/0279625 A1 | 9/2014 | Carter | |
| 2014/0337097 A1 | 11/2014 | Farlie | |
| 2014/0358825 A1 | 12/2014 | Phillipps | |
| 2014/0379439 A1 | 12/2014 | Sekhar | |
| 2015/0089399 A1* | 3/2015 | Megill | H04L 12/1813 |
| | | | 715/753 |
| 2015/0156233 A1 | 6/2015 | Bergo | |
| 2015/0170050 A1 | 6/2015 | Price | |
| 2015/0302308 A1 | 10/2015 | Bartek | |
| 2015/0331601 A1* | 11/2015 | Rosenberg | G06F 3/04842 |
| | | | 715/753 |
| 2015/0347903 A1* | 12/2015 | Saxena | G06T 11/206 |
| | | | 706/11 |
| 2016/0078458 A1 | 3/2016 | Gold | |
| 2016/0170616 A1* | 6/2016 | Rosenberg | G06F 3/04842 |
| | | | 715/753 |
| 2016/0210602 A1* | 7/2016 | Siddique | G06Q 20/0453 |
| 2016/0366200 A1 | 12/2016 | Healy | |
| 2017/0223411 A1* | 8/2017 | de Juan | H04N 21/44231 |

FOREIGN PATENT DOCUMENTS

| | | |
|---|---|---|
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |

OTHER PUBLICATIONS

Beni; "From Swarm Intelligence to Swarm Robotics"; Swarm Robotics WS 2004, LNCS 3342; pp. 1-9; 2005.
Salminen; "Collective Intelligence in Humans: A Literature Review"; Lappeenranta University of Technology, Lahti School of Innovation; 1Proceedings; 2012; 8 pages.
Unanimous A. I.; "What is Swarm Intelligence"; 2015; http://unu.ai/swarm-intelligence/; downloaded Oct. 6, 2016; 3 pages.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
Rosenberg: U.S. Appl. No. 15/959,080, filed Apr. 20, 2018.
PCT; International Search Report and Written Opinion of the International Searching Authority for PCT/US2017/062095 dated May 23, 2018.
Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.
Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.
Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.
Rosenberg; "Artificial Swarm Intelligence vs. Human Experts"; Neural Networks (IJCNN); 2016 International Joint Conference on IEEE; Jul. 24, 2016; 5 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms, a real-time method for collective intelligence"; Proceedings of the European Conference on Artificial Life; Jul. 2015; pp. 658-659.
USPTO; Non-Final Office Action for U.S. Appl. No. 16/668,970 dated Aug. 15, 2017.
Yeung et al.; "Metacognition in human decision-making: confidence and error monitoring"; Philosophical Transactions of the Royal Society B; 2012; pp. 1310-1321.
Ding et al; "Time Weight Collaborative Filtering"; CIKM'05, Oct. 31-Nov. 5, 2005; Bremen, Germany; pp. 485-492.
EP; Extended European Search Report for EP Application No. 15808982.1 dated from the European Patent Office Nov. 28, 2017.
EP; Extended European Search Report for EP Application No. 15852495.9 dated from the European Patent Office Mar. 21, 2018.
Rosenberg; U.S. Appl. No. 15/898,468, filed Feb. 17, 2018.
Rosenberg; U.S. Appl. No. 15/904,239, filed Feb. 23, 2018.
Rosenberg; U.S. Appl. No. 15/910,934, filed Mar. 2, 2018.
Rosenberg; U.S. Appl. No. 15/922,453, filed Mar. 15, 2018.
Rosenberg; U.S. Appl. No. 15/936,324, filed Mar. 26, 2018.
USPTO; Non-Final Office Action for U.S. Appl. No. 15/047,522 dated Jan. 5, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.
USPTO; Non-Final Office Action for U.S. Appl. No. 14/925,837 dated Apr. 3, 2018.
USPTO; Non-Final Office Action for U.S. Appl. No. 15/052,876 dated Feb. 22, 2018.
USPTO; Non-Final Office Action for U.S. Appl. No. 15/086,034 dated Feb. 2, 2018.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
"Dialogr—A simple tool for collective thinking"; Mar. 25, 2015; http://www.dialogr.com./; 1 page.
Deck et al; "Prediction Markets in the Laboratory"; University of Arkansas and Chapman University; J. Econ. Surv., 2013; 33 pages.
Deneubourg et al; "Collective Patterns and Decision-Making"; Ethology Ecology & Evolution; Mar. 22, 1989; pp. 295-311.
Gauchou et al; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.

(56) References Cited

OTHER PUBLICATIONS

Malone et al; "Harnessing Crowds: Mapping the Genome of Collective Intelligence"; MIT Center for Collective Intelligence; Feb. 2009; 20 pages.
Meyer; "Meet Loomio, The Small-Scale Decision-Making Platform With the Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
PCT; International Search Report and Written Opinion of the International Searching Authority for PCT/US2015/56394 dated Feb. 4, 2016.
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-f unds-viewer-con . . . ; downloaded Mar. 25, 2015; 4 pages.
Rosenberg; "Human Swarming and the Future of Collective Intelligence"; Singularity WebLog; https://www.singularityweblog.com/human-swarming-and-the-future-of-collective-intelligence/; Jul. 19, 2015; 7 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Monkey Room"; Outland Pictures; Amazon; Mar. 30, 2014; 110 pages.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1, 2016.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.
PCT; International Search Report and Written Opinion of the International Searching Authority for PCT/US2017/040480 dated Oct. 23, 2017.
USPTO; Final Office Action for U.S. Appl. No. 15/086,034 dated Jul. 17, 2018.
USPTO; Non-Final Office Action for U.S. Appl. No. 14/920,819 dated Jun. 27, 2018.
USPTO; Non-Final Office Action for U.S. Appl. No. 14/738,768 dated Sep. 8, 2017.
EP; Extended European Search Report for EP Application No. 15767909.3 dated from the European Patent Office dated Sep. 4, 2017.

\* cited by examiner

TIME STEP = 0 sec

TIME STEP @ 6 sec

METHODS FOR ANALYZING DECISIONS MADE BY REAL-TIME COLLECTIVE INTELLIGENCE SYSTEMS

This application claims the benefit of U.S. Provisional Application No. 62/207,234 entitled METHODS FOR ANALYZING THE DECISIONS MADE BY REAL-TIME COLLECTIVE INTELLIGENCE SYSTEMS, filed Aug. 19, 2015, which is incorporated in its entirety herein by reference.

This application is a continuation-in-part of U.S. application Ser. No. 14/668,970 entitled METHODS AND SYSTEMS FOR REAL-TIME CLOSED-LOOP COLLABORATIVE INTELLIGENCE, filed Mar. 25, 2015, which in turn claims the benefit of U.S. Provisional Application 61/970,885 entitled METHOD AND SYSTEM FOR ENABLING A GROUPWISE COLLABORATIVE CONSCIOUSNESS, filed Mar. 26, 2014, both of which are incorporated in their entirety herein by reference.

This application is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turn claims the benefit of U.S. Provisional Application 61/991,505 entitled METHODS AND SYSTEM FOR MULTI-TIER COLLABORATIVE INTELLIGENCE, filed May 10, 2014, both of which are incorporated in their entirety herein by reference.

This application is a continuation-in-part of U.S. application Ser. No. 14/738,768 entitled INTUITIVE INTERFACES FOR REAL-TIME COLLABORATIVE INTELLIGENCE, filed Jun. 12, 2015, which in turn claims the benefit of U.S. Provisional Application 62/012,403 entitled INTUITIVE INTERFACE FOR REAL-TIME COLLABORATIVE CONTROL, filed Jun. 15, 2014, both of which are incorporated in their entirety herein by reference.

This application is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015 which in turn claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, both of which are incorporated in their entirety herein by reference.

This application is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015 which in turn claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014, both of which are incorporated in their entirety herein by reference.

This application is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015 which in turn claims the benefit of U.S. Provisional Application No. 62/069,360 entitled SYSTEMS AND METHODS FOR ENABLING AND MODERATING A MASSIVELY-PARALLEL REAL-TIME SYNCHRONOUS COLLABORATIVE SUPER-INTELLIGENCE, filed Oct. 28, 2014, both of which are incorporated in their entirety herein by reference.

This application is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016 which in turn claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, both of which are incorporated in their entirety herein by reference.

This application is a continuation-in-part of U.S. application Ser. No. 15/047,522 entitled SYSTEMS AND METHODS FOR COLLABORATIVE SYNCHRONOUS IMAGE SELECTION, filed Feb. 18, 2016 which in turn claims the benefit of U.S. Provisional Application No. 62/117,808 entitled SYSTEM AND METHODS FOR COLLABORATIVE SYNCHRONOUS IMAGE SELECTION, filed Feb. 18, 2015, both of which are incorporated in their entirety herein by reference.

This application is a continuation-in-part of U.S. application Ser. No. 15/052,876 entitled DYNAMIC SYSTEMS FOR OPTIMIZATION OF REAL-TIME COLLABORATIVE INTELLIGENCE, filed Feb. 25, 2016 which in turn claims the benefit of U.S. Provisional Application No. 62/120,618 entitled APPLICATION OF DYNAMIC RESTORING FORCES TO OPTIMIZE GROUP INTELLIGENCE IN REAL-TIME SOCIAL SWARMS, filed Feb. 25, 2015, both of which are incorporated in their entirety herein by reference.

This application is a continuation-in-part of U.S. application Ser. No. 15/086,034 entitled SYSTEM AND METHOD FOR MODERATING REAL-TIME CLOSED-LOOP COLLABORATIVE DECISIONS ON MOBILE DEVICES, filed Mar. 30, 2016 which in turn claims the benefit of U.S. Provisional Application No. 62/140,032 entitled SYSTEM AND METHOD FOR MODERATING A REAL-TIME CLOSED-LOOP COLLABORATIVE APPROVAL FROM A GROUP OF MOBILE USERS filed Mar. 30, 2015, both of which are incorporated in their entirety herein by reference.

This application is a continuation-in-part of U.S. application Ser. No. 15/199,990 entitled METHODS AND SYSTEMS FOR ENABLING A CREDIT ECONOMY IN A REAL-TIME COLLABORATIVE INTELLIGENCE, filed Jul. 1, 2016, which in turn claims the benefit of U.S. Provisional Application No. 62/187,470 entitled METHODS AND SYSTEMS FOR ENABLING A CREDIT ECONOMY IN A REAL-TIME SYNCHRONOUS COLLABORATIVE SYSTEM filed Jul. 1, 2015, both of which are incorporated in their entirety herein by reference.

This application is a continuation-in-part of International Application No. PCT/US15/22594, filed Mar. 25, 2015.

This application is a continuation-in-part of International Application No. PCT/US15/35694, filed Jun. 12, 2015.

This application is a continuation-in-part of International Application No. PCT/US15/56394, filed Oct. 20, 2015.

This application is a continuation-in-part of International Application No. PCT/US16/40600, filed Jul. 1, 2016.

BACKGROUND OF THE INVENTION

1. Field of the Invention

The present invention relates generally to systems and methods for collaborative intelligence, and more specifically to systems and methods for closed-loop, dynamic collaborative intelligence. Even more specifically, the invention related to analysis methods for decisions made by a collaborative intelligence comprised of networked user working as a distributed real-time closed-loop dynamics system.

2. Discussion of the Related Art

Portable computing devices, such as cell phones, personal digital assistants, and portable media players have become popular personal devices due to their highly portable nature, their ability to provide accessibility to a large library of stored media files, their interconnectivity with existing computer networks, and their ability to pass information to other portable computing devices and/or to centralized servers through phone networks, wireless networks and/or through local spontaneous networks such as Bluetooth® networks. Many of these devices also provide the ability to store and display media, such as songs, videos, podcasts, ebooks, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to have a real-time group-wise experience that evokes the group's collaborative intent and intelligence (Collaborative Consciousness). Hence, there is a substantial need to provide tools and methods by which groups of individuals, each having a portable computing device upon their person, to more easily contribute their personal will/intent to an emerging collaborative consciousness, allowing the group to collectively answer questions or otherwise express their group-wise will in real-time. Furthermore, there is a need to provide tools and methods that enable groups of users to be informed of the group-wise will that is emerging in real-time. The present invention, as described herein, addresses these and other deficiencies present in the art.

SUMMARY OF THE INVENTION

Several embodiments of the invention advantageously address the needs above as well as other needs by providing a method for faction assignment for a group of individual users participating in a decision process including the real-time collaborative control of a graphical object and a plurality of selections targets, each user of the group of individual users associated with and interacting with an individual computing device that exchanges data with a collaboration server, the collaboration server performing the steps of: receiving, from each of the computing devices at each time step of the decision process, at least one real-time user intent value reflecting the associated individual user's current user input regarding a desired motion of the graphical object, whereby a current location and orientation of a user icon associated with the user is updated on a display of the computing device of the associated user; determining, for each time step, a current location, on the display, of the graphical object based at least in part upon the plurality of real-time user intent values received from the plurality of computing devices; determining, for each time step, one spatial region associated with each selection target, wherein spatial regions do not overlap, wherein each spatial region is determined based at least in part on the current location of the graphical object; determining, for each time step and for each user, if the user icon is associated with one spatial region; and assigning, for each time step, for each user icon associated with one spatial region, of the user to a faction associated with the spatial region associated with the selection target.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
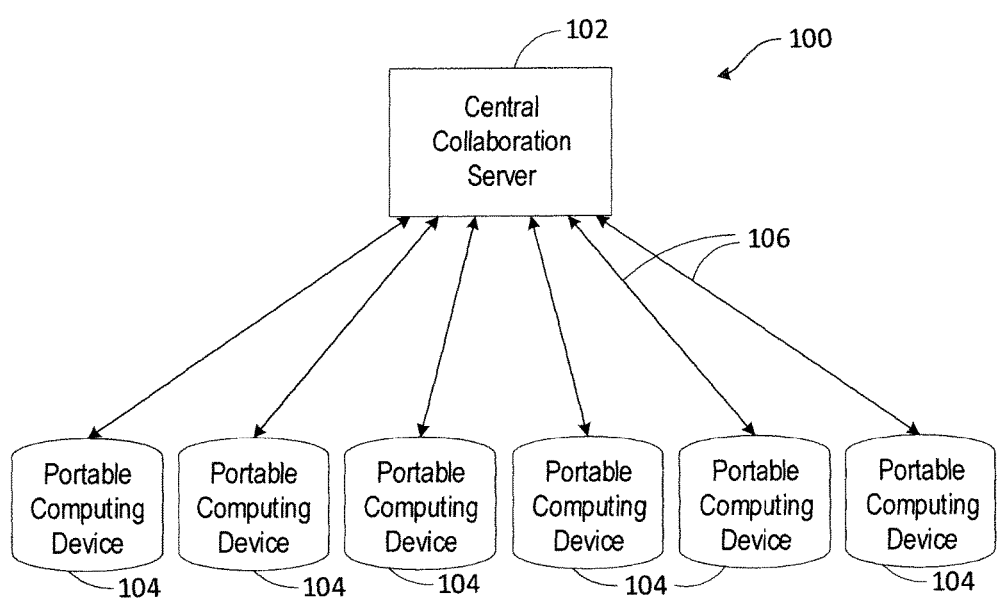
FIG. 1 is a schematic diagram of an exemplary real-time collaborative system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Real-time occurrences as referenced herein are those that are substantially current within the context of human perception and reaction.

As described in related patent applications Ser. Nos. 14/668,970, 14/708,038 and 14/473,768, the massive connectivity provided by the Internet is used to create a real-time closed-loop collaborative consciousness (or emergent group-wise intelligence) by collecting real-time input from large numbers of people through a novel user interface and processing the collected input from that large number of users into a singular group intent that can collectively answer questions, make statements, take actions, select functions, or otherwise respond to prompts in real time. The methods use intervening software and hardware to moderate the process, closing the loop around the disparate input from each of the many individual participants and the singular output of the group.

A collaboration system has been developed that allows the group of users to collaboratively control a graphical pointer 210 in order to collaboratively answer questions or otherwise respond to prompts. In one embodiment, each individual user ("participant") engages the user interface on a computing device 104, conveying his or her individual real-time will in response to a prompt such as a textually displayed (or audibly displayed) question as well as in response to real-time feedback provided to the user of the group's emerging real-time intent. This closes the loop around each user, for he is conveying individual intent while also reacting to the group's emerging intent. Thus each user must be able to see not only the prompt that begins a session, but the real-time group intent as it is forming. For example, if the intent is being conveyed as words, the user will see those words form, letter by letter. If the intent is being conveyed as a direction, the user sees the direction form, degree by degree. If the intent is being conveyed as a choice among objects, the user sees the graphical pointer 210 get closer and closer to a particular chosen object. Thus, the user is seeing the group's will emerge before his eyes, reacting to that will in real-time, and thus contributing to it. This closes the loop, not just around one user, but around all users who have a similar experience on their own individual computing device 104 at substantially the same time. While the embodiments described generally refer to portable computing devices, it will be understood that non-portable computing devices, such as desktop computers, may also be used.

Using the disclosed systems and methods, a "social swarming" platform is enabled that allows users to join one of a plurality of hosted groups (also referred to as swarms), each group comprising a plurality of users. The user may collaborate with that group, earn scores and/or credits and/or rankings based on his performance with respect to others in the group, and browse the stored output from other groups. In some embodiments, groups can compete with other groups, each of said groups also earning group scores, credits, and/or rankings with respect to other groups.

Referring first to FIG. 1, a schematic diagram of an exemplary collaboration system 100 is shown. Shown are a Central Collaboration Server (CCS) 102, the plurality of portable computing devices 104, and a plurality of exchanges of data 106 with the Central Collaboration Server 102.

Embodiments of the plurality of portable computing devices 104 and the interaction of the computing devices 104 with the system 100 are previously disclosed in the related patent applications.

As shown in FIG. 1, the system 100 comprises the Central Collaboration Server (CCS) 102 in communication with the plurality of computing devices 104, each of said computing devices 104 running a Collaborative Intent Application ("CIA"). The system 100 is designed to enable the plurality of users, each engaging an interface of one of said computing devices 104, to jointly control a single graphical element, for example the movable pointer 210, through real-time group-wise collaboration. In some embodiments, such as a multi-tier architecture, the portable computing devices 104 may communicate with each other. The CCS 102 includes software and additional elements as necessary to perform the required functions. In this application, it will be understood that the term "CCS" may be used to refer to the software of the CCS 102 or other elements of the CCS 102 that are performing the given function.

Although multiple pointers controlled by multiple swarms (also referred to as groups) is enabled by the innovations of the present invention, for the current discussion we will give examples that are confined to a single swarm. This is for simplicity of description and is not intended to limit the scope of the innovations.

Referring again to FIG. 1, each of the computing devices 104 comprises one or more processors capable of running the CIA routines and displaying a representation of the pointer 210 along with a plurality of graphical input choices 208. The computing device 104 could be, for example, a personal computer running the CIA application. It could also be a mobile device such as a smart phone, tablet, headset, smart-watch, or other portable computing device running the CIA. The CIA software code can be configured as a stand-alone executable or be code that executes inside a web-browser or other shell.

While FIG. 1 shows only six computing devices 104 in communication with the CCS 102, the system 100 is highly scalable, enabling hundreds, thousands, or even millions of users to connect simultaneously to the CCS 102, each using their own computing device 104, thereby sharing a real-time collaborative experience with the other users. In this way, large numbers of users can collaboratively control the pointer 210 to generate a response as a group intelligence.

While FIG. 1 shows simple top-down architecture for direct communication between the CCS 102 and each of the computing devices 104, related application Ser. No. 14/708,038 entitled MULTI-GROUP METHODS AND SYSTEMS FOR REAL-TIME MULTI-TIER COLLABORATIVE INTELLIGENCE discloses multi-group and tiered architectures that enable shared processing loads among large numbers of computing devices 104. While FIG. 1 shows a dedicated CCS 102, the system 100 can be configured such that one of the computing devices 104 acts as the CCS 102 by running both CCS routines and CIA routines. Such a model is generally viable only when the number of users is low. Regardless of the architecture used, each of said computing devices 104 that is engaged by a participating user includes one or more display devices for presenting a graphical user interface to the user.

Figure 2:
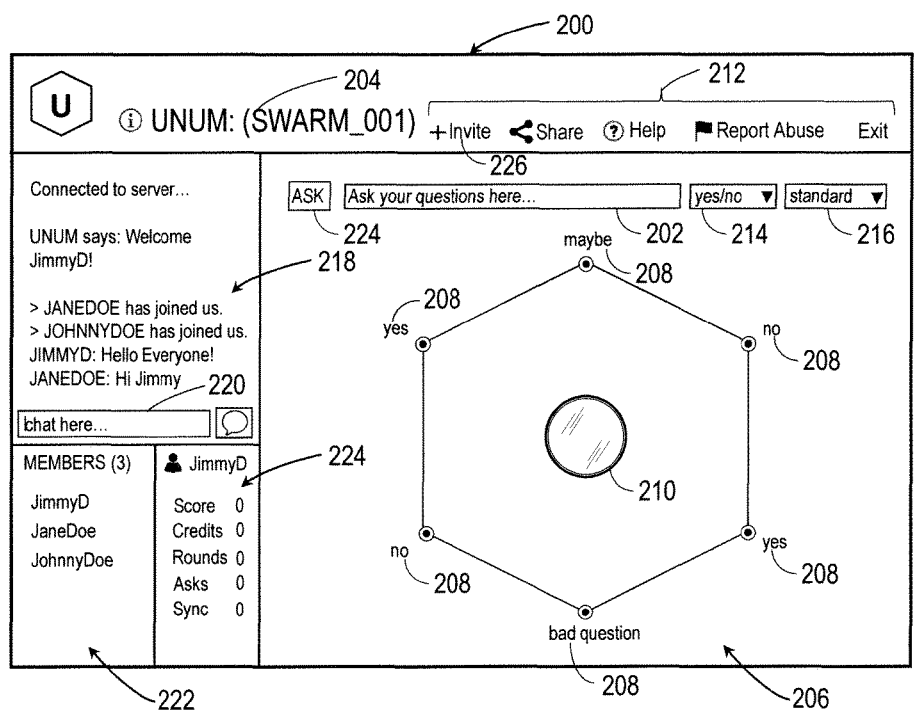
FIG. 2 is an exemplary display interface of a computing device of the collaborative system in accordance with one embodiment of the present invention.

Referring next to FIG. 2, an exemplary display interface 200 is shown in accordance with one embodiment of the present invention. Shown are a prompt bar 202, a group name 204, a target area 206, a plurality of input choices 208, the pointer 210, a communication menu 212, a board selection drop-down menu 214, a physics selection drop-down menu 216, a chat window 218, a chat input box 220, a current member list 222, a statistics display 224, an invite button 226, and an ask button 228.

The collectively controlled graphical pointer 210 is simultaneously displayed to each user by the CIA running on his computing device 104. The pointer 210 displayed to each user appears in a substantially similar position with respect to a set of input choices 208 (as compared to the relative position of the pointer 210 and input choices 208 on other user's screens). The synchrony of the interfaces is coordinated by the data 106 received by each computing device 104 sent from the CCS 102 over the communications link. In a current embodiment, data 106 is sent from the CCS 102 to each of the plurality of computing devices 104 at a rate of 60 updates per second, the data 106 including the current position of the graphical pointer 210 (also referred to as a puck) with respect to the set of graphical input choices 208, as further shown below. Coordination data may also include orientation information.

In general, the input choices 208 are identically displayed upon all the computing devices 104, although some unique embodiments allow for divergent input choices 208. For example, in some embodiments the input choices 208 are displayed in the native language of each user, each input choice 208 conveying a substantially similar verbal message, but translated based on a language setting of the user. This feature enables swarms of individuals who may speak different languages and are unable to communicate directly, to still form a collective intelligence that can collaboratively answer questions. In such embodiments, the displayed questions are also automatically translated into the chosen native language of the user. This is also true of a displayed answer, and optionally the chat window 218 output.

In some embodiments, multiple graphical pointers 210 are displayed by the computing devices 104, each of said graphical pointers 210 being collaboratively controlled by a different group of users. For example, 500 users may be collaboratively controlling Graphical Pointer #1, while a different group of 500 users are collaboratively controlling Graphical Pointer #2. The first group of 500 users comprises a first collective intelligence. The second group of 500 users comprises a second collective intelligence. This unique system and methods allow for the first collective intelligence to compete with the second collective intelligence in a task that is displayed simultaneously to all 1000 users on each of their computing devices 104. For example, one collective intelligence can be enabled to complete with another collective intelligence in a real-time trivial competition, performed head-to-head, simultaneously—group against group.

As shown in FIG. 2, the CIA software running on each computing device 104 is configured to display a graphical display interface 200 that includes at least one collaboratively controlled graphical pointer 210 and the plurality of spatially arranged graphical input choices 208. In the example shown, the graphical pointer 210 is configured to look like a "glass puck" with a central viewing area that is transparent. In the example shown, the input choices 208 are configured as a hexagon of six input choices 208, each input choice 208 including a graphical icon (in the embodiment shown, a dot inside a circle) and an associated word. In this case, the six input choices 208 correspond with possible answers to questions: "Yes", "Maybe", "No", "Yes", "Bad Question", and "No". When the pointer 210 is positioned over one of the input choices 208 such that the input choice 208 is substantially within a centralized viewing area of the pointer 210 for more than a threshold amount of time, that input choice 208 is selected as a target. In common embodiments the threshold amount of time is 3 to 5 seconds. In the current embodiment, the centralized viewing area appears as a graphical etching on the glass pointer 210, the etching remaining invisible until the pointer 210 approaches a target.

As shown in the exemplary embodiment of FIG. 2, the spatially arranged graphical input choices 208 can comprise letters, numbers, words, and/or punctuation marks. The input choices 208 could also comprise photographs. In this example, if the pointer 210 is positioned over one of the six targets for more than the threshold amount of time, that input choice 208 is selected as the answer to a previously asked question.

To ask a question, the user enters the question into the prompt bar 202. Once entered, the user clicks the ask button 228, which sends the question from the CIA software of that particular user (running on his local computing device 104)

to the CCS 102. Because many users could ask questions, the CCS 102 acts as the gate keeper, deeming the first question received (when no question is currently in process) as the one that will be asked to the group. In the current embodiment, not all users are enabled to ask questions at any given time to avoid too much competition for asking. In some embodiments, credits are redeemable by the user for the right to ask the question. In some embodiments, the user must spend credits to ask the question, and can only ask if he has enough credits. In some embodiments, users earn credits based on points awarded for participation in a session. More credits are awarded to users who have high participation scores, less credits being awarded to users with low participation scores. The methods for computing sync scores will be described in more detail further below.

In addition to asking questions, users can select from a plurality of possible target boards by using the board selection drop-down menu 214. The currently selected target board is for yes/no questions. Other target boards may include true/false questions, good/bad questions, and other sets of standardized answers. Also, a spelling board may be included where a full alphabet of input choices 208 are displayed, allowing users to spell out answers (as shown in co-pending applications). The spelling board may also include numbers, punctuation, backspace, blank space, and other alphanumeric characters.

As disclosed in co-pending applications, custom boards can also be entered by selecting "custom" from the board selection drop-down menu 214. As will be disclosed further below, "suggestion mode" can also be selected for a given question through the board selection drop-down menu 214, which asks other users in the plurality of users to give suggestions that populate the board in real-time.

As also shown in FIG. 2, users can selectively use a physics mode from the physics selection drop-down menu 216. As shown, a standard physics mode has been selected, but users can choose ice mode where the pointer 210 slides around on the target board as if it were frictionless ice. A gravity mode is configured to pull the pointer 210 back to a center of the input choice set (i.e. center screen) as if by simulated gravity. In a heavy mode the pointer 210 has substantially higher mass than in standard mode and thus is harder for users to move. In a barrier mode, a set of physical barriers block a direct path to the input choices 208, forcing users to collaboratively guide the pointer 210 around barriers to reach the input choices 208.

As also shown in FIG. 2, the display interface 200 includes the chat window 218 that allows users to exchange messages by typing in the chat input box 220. Also included is the list of current members who are part of the group and thus enabled to ask questions and collaboratively provide control over the pointer 210.

Because users enter this group display interface 200 from a lobby display interface where the user can choose from among a plurality of available collective intelligence groups or swarms, the name of the current collective intelligence group (swarm) is also displayed. In addition, users can invite their friends to this group by clicking on the invite button 226 includes in the communication menu 212. In the current embodiments, these invites can leverage existing social networks such as Facebook® friends and Twitter® followers. Also included in the interface of the current embodiment is the statistics display 224 that gives the user of this instance of the software (on this computing device 104) a listing of his personal statistics including his score, credits, performance value, the number of rounds he has participated in, and the number of questions he has asked the collective intelligence group.

When an exemplary question is entered by one of the users in the group, the question is sent by the CIA on that user's computing device 104 to the CCS 102. If the CCS 102 software determines that the question is valid, the question is then sent to all the users in the group so that it appears substantially simultaneously on the display interface of each of the computing devices 104. In a current embodiment, the question appears in a large box at the top of the target board. Then a "3"-"2"-"1" countdown timer appears at the center of the target board, notifying users get ready for the collaborative answer process, or session, to begin. The display interface (having received instructions from the CCS 102) then displays a graphical "GO" and the users will then collaboratively control the motion of the pointer 210, guiding it towards whichever input choice 208 best satisfies the collaborative will of the group as emergent from the real-time collective intelligence. As disclosed in co-pending applications incorporated herein by reference, the collaborative control may be implemented by each user imparting a real-time intent regarding a desired motion of the puck by manipulating a graphical magnet icon 306 on his or her local computing device. The graphical magnet icon 306 defines a magnitude and direction of the user's personal intent, referred to herein as a user intent vector.

Each answer session is generally limited in total time by the underlying software of the present system 100, for example giving the swarm 60 seconds to converge upon an answer through the collaborative motion of the pointer 210. This time pressure is deliberate, for it inspires users to employ their gut instincts and intuitions rather than over-thinking the question.

To support the use of time-pressure, the countdown clock 304 is displayed on a group display interface 300 of each user (as shown below in FIG. 3), the timing of the plurality of countdown clocks 304 coordinated by handshaking signals from the CCS 102. If the pointer 210 does not reach the target within the allotted 60 seconds, the system 100 determines that the collaboration is a failure, and sends a failure indication to the CIA of each computing device 104. In some embodiments, in response to receiving the failure indication the CIA terminating user input and displaying the words "brain freeze!" on the group interface. In addition, in response to receiving the failure indication all users could lose a number of points and/or credits for the collective failure of the group to guide the pointer 210 to a target.

Figure 4:
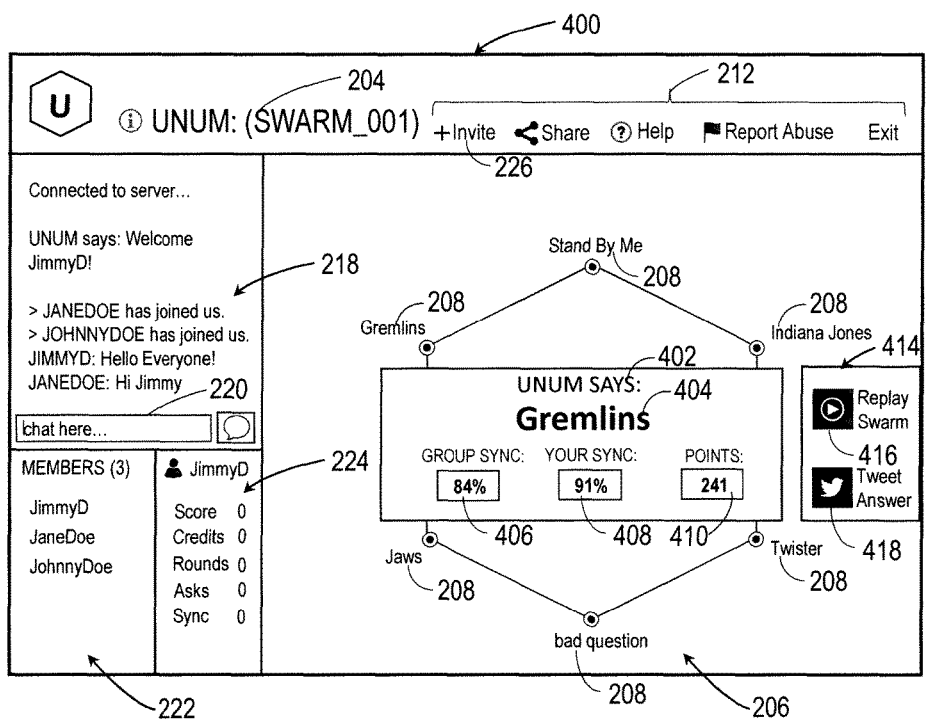
FIG. 4 is an exemplary group display interface of the computing device of the collaborative system after the collaboration session has been successfully completed.

The system 100 is configured to determine that a target is achieved when the group successfully positions the pointer 210 over one input choice 208 for more than the threshold period of time. When the group targets one input choice 208, the target is displayed on the CIA screens of all the users as the answer to the question. Also displayed may be statistics for that answer as shown below in FIG. 4, such as the group cohesiveness score and the user synchronicity value, as previously described in related application Ser. No. 14/708,038. Also displayed may be points and/or credits awarded for the current user's participation in the emergent answer, as shown in FIG. 4.

Figure 3:
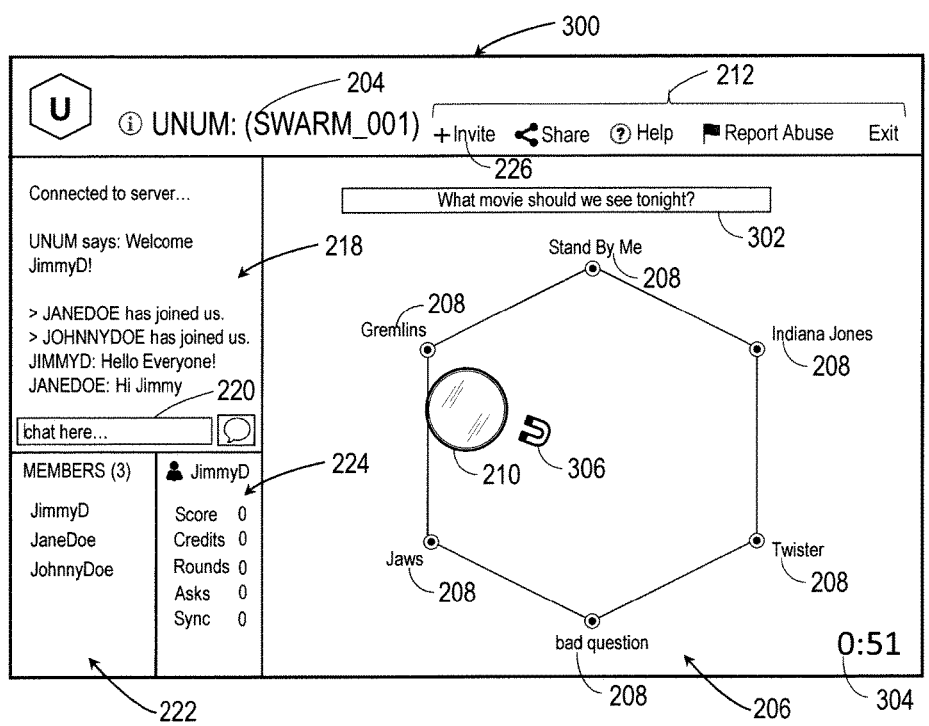
FIG. 3 is an exemplary group display interface of the computing device of the collaborative system at a point in time during a collaboration session.

Referring next to FIG. 3, shown is the exemplary group display interface 300 of one user at a point in time during a collaboration session, i.e. after the question has been received by the computing devices 104 but before the collaboration session has ended. Shown are the group name 204, the target area 206, the plurality of input choices 208, the pointer 210, the communication menu 212, the chat window 218, the chat input box 220, the current member list 222, the statistics display 224, the invite button 226, a question display 302, a countdown clock 304, and the magnet icon 306.

As shown in FIG. 3, the basic layout of the display interface 300 is similar to FIG. 2. In FIG. 3, in the target area 206 the prompt bar 202, the ask button 228, the board selection drop-down menu 214, and the physics selection drop-down menu 216 have been replaced by the question display 302. The question display 302 appears substantially simultaneously upon the screens of the computers of all users in the swarm. Also displayed on the target area 206 are the set of input choices 208 from which the users are being asked to collaboratively select from. In this case the question is—"What movie should we see tonight?" and the input choices 208 include five movie names: "Jaws", "Gremlins", "Stand By Me", "Indiana Jones", and "Twister" along with a sixth input choice 208, "Bad Question". In many embodiments, the Bad Question choice is automatically included in the input choices 208 by the CCS 102, allowing the swarm to collectively reject the question. This allows the group not to waste time on incoherent or undesirable questions.

After the question and input choices 208 appear on the display interfaces of the group members, the "3"-"2"-"1" countdown timer appears (not shown) to signal the start of the current session. When the session begins, the users are now enabled to provide user input to the pointer 210, guiding it towards one of the input choices 208. As the session time progresses, the 60 second countdown clock 304 counts down, applying time pressure to the group. In FIG. 3, the countdown clock 304 is shown at 0:51, indicating that 51 seconds remain in the current session. During the current session, group members may also be inputting messages via text using the chat window 218, and/or may be chatting with a simultaneously enabled group voice chat. This allows interpersonal communication during the session.

As disclosed in the co-pending applications which have been incorporated by reference, each user is enabled to apply forces upon the pointer 210 to convey his individual intent as to how the pointer 210 should move at any moment in time. The displayed motion of the pointer 210, however, is not a reflection of that user's individual input but a reflection of the collectively combined group input from the entire swarm of users. As disclosed in co-pending applications, the collective input from the plurality of users can be such that each user's input imparts an equally weighted contribution to the total force applied to the pointer 210. In some embodiments, weighting factors are used to give the input force from some users a higher contribution as compared to other users. As will be described later in this document, novel methods of adjusting the weighting factors have been developed such that computational configuration of swarms can be dynamically changed over time by the underlying software running on the CCS 102, optimizing the collaborative performance of a given group based on the historical performance of its members.

As disclosed in the co-pending applications which have been incorporated by reference, each user is enabled to apply forces upon the pointer 210 using one of a variety of innovative methods. In one preferred embodiment, disclosed in application Ser. No. 14/473,768, each user controls the graphical magnet icon 306 by manipulating a mouse, touchpad, touchscreen, tilt interface, or other provided user-interface method. In one such embodiment, as the user moves his mouse cursor within a threshold distance of the pointer 210, it turns into the magnet icon 306 that grows larger in size, the closer to the pointer 210 the mouse is positioned. The larger size indicates a larger force. The relative position of the magnet icon 306, which always orients itself towards a center of the pointer 210 under software control, indicates the direction of pull that user wants to impart on the pointer 210. In this way, a user can intuitively impart of force of a selectable magnitude and direction upon the pointer 210.

In other embodiments, the user can tilt the portable computing device 104 to convey a desired magnitude and direction. In such embodiments, the magnet icon 306 or other graphical indicator is displayed to indicate the imparted force. In some such embodiments, the user must also tap the screen while tilting the computing device 104, the frequency of the taps causing a higher force to be applied. This unique use of a combined tilt and tap methodology is highly effective, for it enables one handed input from users on small mobile devices. It also enables the ease of tilting, but avoids it feeling too passive by also requiring frequent tapping. In many such embodiments, the maximum force is applied for only a short time following each tap (for example 0.5 seconds) and then fades away over a subsequent period of time (for example 3 to 5 seconds). The displayed magnet icon 306 shrinks and fades away along with the force magnitude. This is a highly intuitive interface and requires that a user repeatedly tap to maintain a maximally applied force upon the pointer 210. This is an innovative implementation, for it has been found that requiring frequent tapping better engages the user in the collaborative experience when the tilt interface is used.

In other embodiments the user is enabled to swipe across a touchscreen display to indicate the magnitude and direction of the force the user desires to apply to the pointer 210. In many such embodiments the magnet icon 306 is displayed, indicative of the magnitude and direction conveyed by the swipe. In such embodiments, the swipe force is applied for only a short time (for example 0.5 seconds) and then fades away over a period of time (for example 3 to 5 seconds). The magnet shrinks and fades away along with the force magnitude. This is a highly intuitive interface and requires that the user repeatedly swipe the screen to maintain a maximally applied force upon the pointer 210. This is an innovative implementation, for requiring frequent and repeated swipes better engages the user in the collaborative experience when the swipe interface is used.

As disclosed in the co-pending applications, the CCS 102 software collects input from the plurality of users, computes a resultant motion of the pointer 210, and communicates the resultant motion of the pointer 210 to each CIA of the plurality of computing devices 104. The CCS 102 software also determines if the pointer 210 location is successfully targeting one input choice 208 for more than the threshold amount of time. If so, the CCS 102 software determines that the question is answered and communicates the targeted input choice 208 to all members of the group such that it is substantially simultaneously displayed upon the display interface of each computing device 104 included in the group.

In this way, the system 100 of the present invention enables groups of networked users to collaboratively control the graphical pointer 210 in response to one or more questions posed by members of group. More specifically, embodiments of the current system 100 enable each of the plurality of users to view on a screen of their own individual computing devices 104, a representation of the pointer 210 and the target board, and enable each of said users to convey the user intent (also referred to as the user intent value) as to the desired direction (and optionally magnitude) of motion that user wants the pointer 210 to move so as to select one of the input choices displayed on the target area. The user intent is represented as a user intent vector. The user intent vector can be conveyed by the user, for example, by tilting his computing device 104 in the desired direction, swiping the screen in a desired direction, or positioning the mouse such that the graphical magnet icon 306 pulls on the pointer 210 with a desired direction.

In some embodiments, eye tracking hardware and software are included in the computing device 104, for example the eye tracking hardware and software disclosed in U.S. Pat. No. 7,429,108 to the present inventor. The CIA is configured to operate the eye tracking hardware and software and receive input from the eye tracking hardware are software. In the current innovation, a user's gaze is tracked by the CIA and used to compute the user intent vector that represents the user's desired motion of the pointer 210, which is communicated to the CCS 102 software. More specifically, the user's gaze defines a location with respect to the pointer 210. The vector between the location and the center of the pointer 210 is then used by the CIA to compute the magnitude and direction of the user intent vector. In this way, the user can simply look towards a direction that he desires the pointer 210 to move, and the user intent vector is computed by the CIA and sent to the CCS 102 software by the CIA. In some instances the magnet icon 306 or other graphical element is displayed to represent the user intent vector on the display. In this way, the user can participate in the collaborative swarm intelligence experience using a hands-free method.

In some embodiments, a brain-computer interface (sometimes called a mind-machine interface, direct neural interface, synthetic telepathy interface, or a brain-machine interface), is employed to collect the user input of one or more users in the swarm. In some such embodiments, the user's brain-waves are detected by the brain-computer interface as he or she watches the pointer 210 move upon his screen. A calibration session is often required to correlate detected brain activity with a desired direction of motion of the pointer 210, but once that calibration is complete, the brain-computer interface system can be used by the CIA to compute the user intent vector that represents that user's desired motion of the pointer 210 at each time-step during the session, this user intent vector being communicated to the CCS 102 software. In this way, the user can simply think about a direction that he desires the pointer 210 to move, and the user intent vector is computed and sent to the CCS 102 software by the CIA. In some instances the magnet icon 306 or other graphical element is displayed to represent the user intent vector on the screen of the user's computing device 104. In this way, the user can participate in the collaborative swarm intelligence using a hands-free method.

Whatever the input method used (mouse, touchscreen, tilt, eye-tracking, or brain-tracking), the system is configured such that the user intent vector is communicated by the CIA, running on the user's computing device 104, to the Central Collaboration (CCS) 102. The CCS 102 collects the user intent vectors from the plurality of users (via their separate computing devices 104), and then derives a group intent vector that represents the collective will of the group at that time. The group intent vector is then used to compute an updated location of the pointer 210 with respect to the target area and the input choices 208, the updated location reflecting the collective will of the group.

In many preferred embodiments, a physical model is employed in which the pointer 210 is assigned a simulated mass and damping, each user input represented as a simulated force vector. In some such embodiments, the mass and damping of the pointer 210 is adjusted dynamically by the software depending upon a physics mode selected by the user who asks each question by using the physics selection drop-down menu 216 shown in FIG. 2. In some such embodiments, the ice mode can be selected by the user in which the pointer 210 glides very freely as if on ice. In some such embodiments, the heavy mode can be selected by the user in which the pointer 210 requires the collaborative pull of a large majority of members of the swarm to achieve any real velocity. In some embodiments, the mass and damping are dynamically assigned by the software on the CCS 102 depending upon the current size of the swarm, the larger the swarm the higher the mass and higher the damping assigned.

Whether a physics model is used or not, the updated pointer 210 location is then sent by the CCS 102 to each of the computing devices 104 and is used by the CIA running on each of said computing devices 104 to update the displayed location of the pointer 210. In this way, the plurality of users can watch the pointer 210 move, not based on their own individual input, but based on the overall collective intent of the group.

As described in related U.S. patent application Ser. No. 14/668,970, the group intent vector can be computed from the plurality of user intent vectors as a simple average, or may be computed as a weighted average in which some users have more influence on the resulting collective group intent than other users. In such embodiments, the weighting of each user can be derived based on user scores and/or user synchronicity values (also referred to as synchrony values) earned during prior interactions with the system 100. In such embodiments, each user may be assigned one or more variables that represents how his or her input should be weighted with respect to other users in the swarm. In some embodiments the variable is called the user contribution index and is updated regularly to reflect the skill of that user in providing input that helps the group reach a coherent collaborative response. The user who demonstrates a history of "constructive input" (i.e. input that is supportive of the collective intent, will be assigned a higher user contribution index than the user who has demonstrated a history of "destructive input" (i.e. input that is substantially resistant to the collective intent). In this way, users are incentivized push for collaborative consensus.

Those users who are supportive to the emerging consensus are determined computationally by the CCS 102 by repeatedly comparing each user's user intent vector with the group intent vector. The more aligned that user's user intent vector is with the direction of the group intent vector, the more collaborative that user is behaving. The further the user intent vector is from the direction of the group intent vector, the less collaborative the user is behaving. This level of collaboration is represented by the value defined herein and in the related applications as the user's synchrony (or synchronicity). The synchronicity value may be an instant synchronicity value, i.e. one at a certain instant in time, or may be a session synchronicity value representing the overall user synchronicity for one or more sessions.

The synchronicity value for each individual user is determined by the CCS 102 by repeatedly comparing the user intent received from each computing device 104 (representing the user input reflecting the user's intent to move the graphical object of the pointer 210 in a given direction) with the group intent derived from all user intents. The synchronicity value of the individual user is determined but computing the difference between the user intent and the group intent. The synchronicity value may be an instant value, i.e., based on a single comparison of the user intent to the group intent at one point in time, or may be synchronicity value over a specific period of time, e.g. an average of the synchronicity values over that period. Thereby, the user synchronicity value each individual user represents at least in part that user's contribution to the collaborative control of the at least one graphical object.

In some embodiments, each individual's synchrony value ranges between an upper bound value and a lower bound value. In one embodiment, the synchronicity value ranges between +1 to −1, with the value +1 (the upper bound) being assigned when the user intent vector is substantially aligned with the group intent vector, and with the value of −1 (the lower bound) being assigned when the user intent vector is substantially in the opposite direction of the group intent vector, with all values between +1 and −1 being used to represent varying degrees of alignment. For example, if the user intent vector is 90 degrees out phase with the group intent vector, a value of 0 is assigned, for that is halfway between fully convergent and fully divergent. Thus, a skilled user is one who is able to convey his individual intent as input, but do so in a cooperative manner. Such a user will maintain a positive synchrony value during much of the session, for he or she is being supportive of the group intent. A user who maintains a positive value will be awarded more points and be assigned a higher user contribution index than a user who does not.

In some embodiments, the user's synchronicity values are computed as a percentage from 0% to 100%, for that is often an easier metric for users to understand. The session synchronicity value of 100% means the user has been perfectly in sync with the swarm. The session synchronicity value of 0% means the user has been entirely out of sync with the swarm. Session synchronicity values between 0% and 100% reflect relative synchronization with the swarm, with a 50% synchronicity value meaning the user was neutral with respect to the swarm. This is described in more detail later in this document.

In some embodiments, an average (or mean) synchronicity value is computed for the user over some number of prior questions. For example a "sync_5" synchronicity value can be computed as that user's average synchronicity value over the last five sessions. This is a highly useful value for it indicates how cooperative the user has been over a recent period of time. The "sync_5" synchronicity value can be used in combination with other time-histories, such as a "sync_50" synchronicity value which indicates the average synchronicity value for that user over the last 50 sessions, in order to compute that user's weighting value in the swarm. In some embodiments, the mean synchronicity value may be time-weighted such that time steps near the end of the session time period are more heavily weighted than time steps near the start of the time period.

In some embodiments, the CCS 102 determines at least one user assessment based at least in part upon one of more user synchronicity values. For examples, one assessment may be configured to determine whether the user is categorized as "flexible" or "entrenched". In another example, one assessment may be configured to determine whether the user is "constructive" or "destructive".

Referring next to FIG. 4, shown is an exemplary display interface 400 as displayed on the computing device 104 being used by one user of a group, shown at a moment in time after the group has successfully positioned the pointer 210 on one of the input choices 208, selecting the input choice 208 as the target, thereby collaboratively choosing the answer. Shown are the group name 204, the target area 206, the plurality of input choices 208, the communication menu 212, the chat window 218, the chat input box 220, the current member list 222, the statistics display 224, the invite button 226, a prefix text 402, a target text 404, a group cohesiveness score indication 406, a session synchronicity value score indication 408, a points indication 410, an answer window 412, an answer options tab 414, a replay swarm icon 416, and a Tweet answer icon 418.

In this instance, the target is "Gremlins", reflecting the swarm's collaborative will in response to the posed question: "What movie should we see tonight?" As shown in FIG. 4, the target is graphically displayed to each user on the screen of his or her computing device 104 (as controlled by the CIA software running on that device 104). In the embodiment shown, the graphical display includes the answer window 412 including the prefix text 402 "UNUM says:" along with the chosen target: "Gremlins".

In some embodiments, the answer is also displayed in the chat window 218, as if communicated by the personified entity "UNUM" itself. This gives the swarm intelligence a feeling of personality and presence.

Also displayed in the answer window 412 is one or more statistics computed by the CCS 102 software. The statistics may reflect the performance of the group as a whole or reflect the performance of the particular user of that computing device 104. In this example, the group cohesiveness score indication 406, reflecting the synchronicity of the group, is shown of 84%, which indicates that the group was 84% aligned in their imparted motion of the pointer 210. The group cohesiveness score indication 406 includes the text "GROUP SYNC:" The group cohesiveness score of 84% shows strong convergence of group members, reflecting that the swarm intelligence spoke with high "conviction" when answering this question. A low group cohesiveness score would reflect a low conviction for the swarm intelligence. In some embodiments the group cohesiveness score may be repeatedly reported to and repeatedly displayed by each of the computing devices 104, for example during the session.

Related application Ser. No. 14/708,038 discloses some methods of computing the group cohesiveness score, such as to compute a running average of the absolute value (i.e. magnitude) of the group intent vector over time. The group cohesiveness score may have an upper bound and a lower bound, wherein a group cohesiveness score at the upper bound indicates that the plurality of real-time user intents are substantially aligned with each other, and a group cohesiveness score at the lower bound indicates that the plurality of real-time user intent values are substantially misaligned with each other. In one embodiment, the lower bound is essentially 0, as the summation of the user intent vectors, being opposite (exactly misaligned), cancel each other out.

In some embodiments, the CCS 102 determines at least one group assessment based at least in part upon one of more group cohesiveness scores. For examples, one assessment may be configured to determine whether the group is categorized as "flexible" or "entrenched".

The group cohesiveness score may be repeatedly calculated by the CCS 102 during the session and repeatedly received by each of the portable computing devices 104.

In another embodiment, the real-time user intent values are determined to be substantially aligned with each other (i.e. at or near the upper bound) when their vector directions are substantially the same in at least a plane. The real-time user intent values are determined to be substantially misaligned with each other (i.e. at or near the lower bound) when a summation of their vector directions substantially cancel each other out, resulting in a near zero resultant.

Also displayed in the answer window 412 is the session user synchronicity value score indication 408. The session user synchronicity value is a statistical indication of how well the particular user of this computing device 104 was aligned in his input with the swarm as a whole. The session synchronicity value score indication 408 includes the text "YOUR SYNC:" and value of 91%. In this case, the user was very highly aligned, achieving a 91% synchronicity value.

Also displayed in the answer window 412 is the points indication 410, indicating the number of points earned by this user as a result of his or her participation during the session. The user in this session has earned 241 points, as shown in the points indication 410. The points indication 410 also includes the text "POINTS:"

Users earn more points (or credits) as a result of being constructively collaborative, helping the swarm reach a meaningful consensus. Users earn less points (credits) as a result of being non-collaborative (obstructive), blocking the swarm from finding a meaningful consensus. In the case where the swarm cannot answer a question within the allotted time because consensus is never reached, all users lose points (credits). This innovative scoring method encourages participants to be collaborative rather than obstructionist, thereby improving the performance of the swarm intelligence. This imposes a philosophical situation often referred to as a Prisoner's Dilemma and structures it uniquely such that group collaboration and consensus trumps group stagnation and entrenchment. In this way, the present invention helps groups to find common ground.

Also displayed is the answer options tab 414 which gives users options related to the answer that was just reached by the swarm. The user can selectively Tweet® the answer by selecting the Tweet answer icon 418. This triggers a routine within the CIA that sends a Tweet request to the CCS 102 software, which then sends an automated Tweet to Twitter. The Tweet includes the question and the selected answer. The Tweet also includes a numerical indication of the number of users who participated in answering the given question, thus conveying the size of the swarm intelligence which produced this Tweet. The Tweet also includes a hashtag, for example "#UNUMsays", as well as an indication of the group cohesiveness score. In this way, the swarm intelligence system comprised of dozens, hundreds, or even thousands of individual minds working as one can is given a unique voice as a social media entity. Enabling collaborative groups to ask questions, answer questions, and voice the swarm's collaborative intent over Twitter as a unique entity is highly unique and appealing to users. In some embodiments, the decision to Tweet an answer is posed by the software to the swarm. A question appears, e.g. "Should we tweet this?", and a set of answers appear "yes", "no", etc. If the group picks "yes" or an equivalent, the swarm intelligence has decided to send its own Tweet. In this way, the invention described herein enables the formation of a swarm intelligence, enables that swarm intelligence to answer questions, enables that swarm intelligence to consider the answer that emerges and decide if that swarm intelligence wants to Tweet the answer publically.

As also included in the answer options tab 414, each individual user can select a replay swarm icon 416. Upon selection of the replay swarm icon 416, the session resulting in the current answer is replayed on the display. The session replay is unique in that it displays an indication of the input of all users in the group at the same time (i.e. the swarm input), giving insight into how the swarm converged upon the collective answer. The video of the swarm input is displayed in high speed (generally 2× to 5× the speed of the real session). This saves time while also conveying a more intuitive display of swarm activity, for the high speed motion of the swarm input indicates the central tendencies more effectively than a real-time display.

Figure 5:
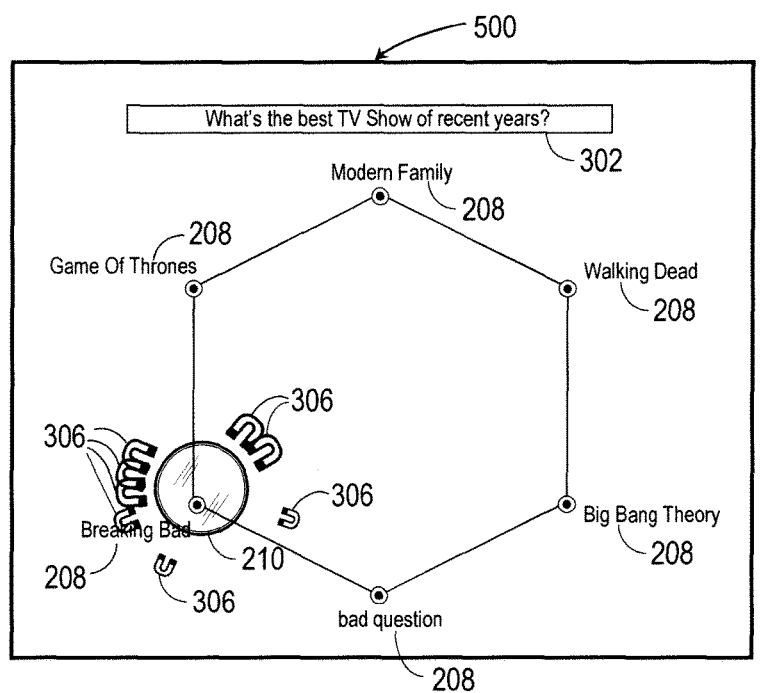
FIG. 5 is a frame of an exemplary collaboration session replay video

Referring next to FIG. 5, a frame of an exemplary session replay video 500 is shown. Shown are the target area 206, the plurality of input choices 208, the question display 302, and the plurality of magnet icons 306.

As shown in FIG. 5, the session replay includes the question asked, the input choices 208, and the graphical indication of the trajectory taken by the pointer 210 during the answer period. Also displayed is the graphical indication of the input provided by each user of the swarm at each time-step during the answer session. In this instance, the graphical magnet icon 306 is displayed for each user, the size and orientation of each magnet icon 306 with respect to the pointer 210 indicating the magnitude and direction of that user's user intent vector (magnitude and direction) upon the pointer 210 at each given moment in time. In this example, 8 users were participating in the swarm, collaboratively moving the pointer 210 to an answer. This method is scalable to much larger numbers of users.

In some embodiments where hundreds or even thousands of users are participating at the same time, other innovative methods are employed to make the replay coherent. In one such embodiment, when the number of magnet icons 306 exceeds a threshold, they are grouped and averaged, for example showing one composite magnet icon 306 to represent every group of 10 in the swarm. In this way, a swarm with 800 users can be represented by a replay display of 80 magnet icons 306. This is highly informative to the user, conveying the central tendency of the swarm without overwhelming the display with too many magnet icons 306 (or other graphical indicators). In some embodiments, the user can select the replay speed. In some embodiments, the software running on the local user's computing device 104 can be configured to show all magnet icons 306 in the replay as a uniform color except for the magnet icon 306 representing the time-history of that particular user's input. For that user, the magnet icon 306 can be shown as an alternate color with visual contrast. In this way, the user can observe the swarm of many magnet icons 306 as the history of the session is replayed and identify his or her own magnet icon*among the swarm of many magnet icons 306 because his own magnet icon 306 is displayed in the alternate color. To enable this, the local software on each computing device 104 is configured to identify which magnet icon 306 in the replay is associated with the user of that computing device 104. Such identification can be achieved by associating each magnet icon 306 in the replay with a unique user ID value stored in memory.

As disclosed herein, the present invention employs a number of inventive systems and/or methods for dynamically modifying the configuration of the group to optimize the performance of that group over time. More specifically, each group is a collection of intelligent members (users) that are networked together in real-time, each of them providing collaborative input that's numerically combined into a singular intelligent output. To optimize the performance of a given group, a number of approaches have been developed, which can be used alone or in combination.

A first approach is to dynamically modify the swarm population by purging the swarm of one or more of its currently low-performing members (the input from said members determined to be substantially out of sync with collaborative will of the swarm, i.e. having a low synchronicity value) and/or setting a statistical threshold associated with a given group that bars non-compatible and/or low-performing members from joining that given group. These techniques modulate the make-up the group in real time, by filtering the addition of new members and/or moderating the ejection of low-performing members, all with the goal of maintaining a group configuration that behaves with high levels of collaboration.

A second approach is to dynamically modify the connection strengths within a given group population by adjusting the weighting assigned to the inputs from each individual user, the weightings assigned to each given user being modulated to improve overall group performance. More specifically, the CCS 102 software is selectively configured to increase the weighting of inputs from high-performing members of the group in terms of their collaborative behavior, and decrease the weightings of inputs from low-performing members of a swarm in terms of their collaborative behavior.

In order for the CCS 102 to purge users from the group, institute thresholds that limit entry into the group, and/or dynamically modify the connection strengths within the group, the CCS 102 must quantify swarm performance as well as user performance in the context of collaboration, for determining levels of collaborative performance is used as the basis for dynamic modulation of the group. To perform such quantification, the group cohesiveness score (representing the group synchrony) and the user synchronicity value (synchrony value) is used.

In the context of the collaborative swarming inventions disclosed herein, and as disclosed in the related applications, "synchrony" is defined as a statistical measure of collaboration within and among members of a real-time networked swarm. More specifically, "synchrony" is determined computationally by the software running on the CCS 102 based on the degree of alignment (in direction and magnitude) among the user input collected from all member of a swarm during a response. Because the degree of alignment changes at every time-step, the software running on the CCS 102 is configured to integrate over the response period, producing time-weighted average. In this way, the synchrony computed during a single question/answer session is the time-weighted average of the instantaneous synchrony (i.e. alignment among input vectors) across all time steps.

Further, the two types of synchrony are computed by the CCS 102 software and communicated to each of the peers: group synchrony and individual synchrony. These are described in detail as follows:

As previously disclosed in application Ser. No. 14/708, 038, the group cohesiveness score is an indication of the collaborative coordination of the group as it answers a question or completes a task, derived by computing the degree of alignment among the full set of user intent vectors from all participating users in the group, integrated across all time steps of the session. In many current embodiments, this value is expressed as a percentage between 0% and 100%. In many embodiments, the computation is configured such that if, in theory, all of the users of a group coordinate perfectly during the session (i.e. all users impart input vectors of the exact same magnitude and direction at every time step across the session), that group would deemed to have a group cohesiveness score of 100%. In practice, this rarely happens. Ideally, the outcome of the session is one where the central tendency of the group leads to a coherent answer through the motion of the pointer 210. This generally translates into a group cohesiveness score between 65% and 90%. Conversely, if all members of the group are pulling in the exact opposite directions (i.e. all user intent vectors perfectly cancel out), the pointer 210 will not move at all, resulting in a stalemate. This translates into the group cohesiveness score of 0%. In practice, this too rarely happens. That said, the inventive system still identifies unproductive swarms where the pointer 210 sputters, moving in one direction and another, but never finds enough consensus to drive the pointer 210 to the answer. Such sessions generally have the group cohesiveness score of between 10% and 35%.

Thus, an effective group will have the high group cohesiveness score (>65%), while an ineffective group, unable to converge on answers will have the low group cohesiveness score (<35%). Groups with the group cohesiveness score of around 50% will generally converge on coherent answers, but the group's "conviction" in those answers will not be as strong as sessions with the higher group cohesiveness score. To encourage convergent groups, the CCS 102 software is configured to measure and report the group cohesiveness score to every user after every session (i.e. every collaborative answer). By giving users a direct and easy to understand measure of the collaborative coherence of the group, they can understand if the group is performing well together and adapt their actions accordingly. Further, when points (or credits) are awarded to members of the group, the points are scaled by group cohesiveness score. Thus all users are rewarded when the group shows high synchrony (i.e. strong collaboration) by having a high group cohesiveness score, for they were able to converge on an answer with high conviction. By rewarding individual members for the level of cooperation achieved across the group, all users are incentivized to seek common ground, guiding the pointer 210 to the answer that best satisfies the collaborative will of the entire group. This is a very powerful and important method of driving coherent group.

Of course some users may be deliberately divergent, while other users will be contributing greatly to the overall cohesion of the swarm. To quantify these differences, we compute the user synchronicity value for every user. Like the group cohesiveness score indicating the degree of group synchrony, the user synchronicity value is a time-weighted average that's integrated across all time steps, but in this case the synchronicity value is a measurement of how well aligned a single user is with respect to the group as a whole. Because the synchronicity value is personalized for each user, the CCS 102 software must compute the user synchronicity value independently for each member in the group, indicating how well aligned that user's input vector was with the overall group input vector. The user with the high synchronicity value (>65%) during the session is deemed to have been highly supportive of the resulting consensus, contributing to the emergent response. Conversely, the user with the low synchronicity value (<35%) during the session is deemed by the software to be obstructionist, standing in the way of compromise and consensus.

To encourage constructive behavior from participants, the CCS 102 software measures and reports each user synchronicity value after each session sending each user their personal user synchronicity value for display on their own computing device 104. In addition, when points (or credits) are awarded to the user, the number of credits or points is based at least in part on that user's user synchronicity value and/or the group cohesiveness score. In some current embodiments of the invention, user points (or credits) are awarded based 60% on that user's user synchronicity value and 40% on the overall group cohesiveness score. In this way, users are incentivized to perform collaboratively as individuals, while also being incentivized to push the swarm to behave collaboratively overall. This is highly effective.

Figure 6:
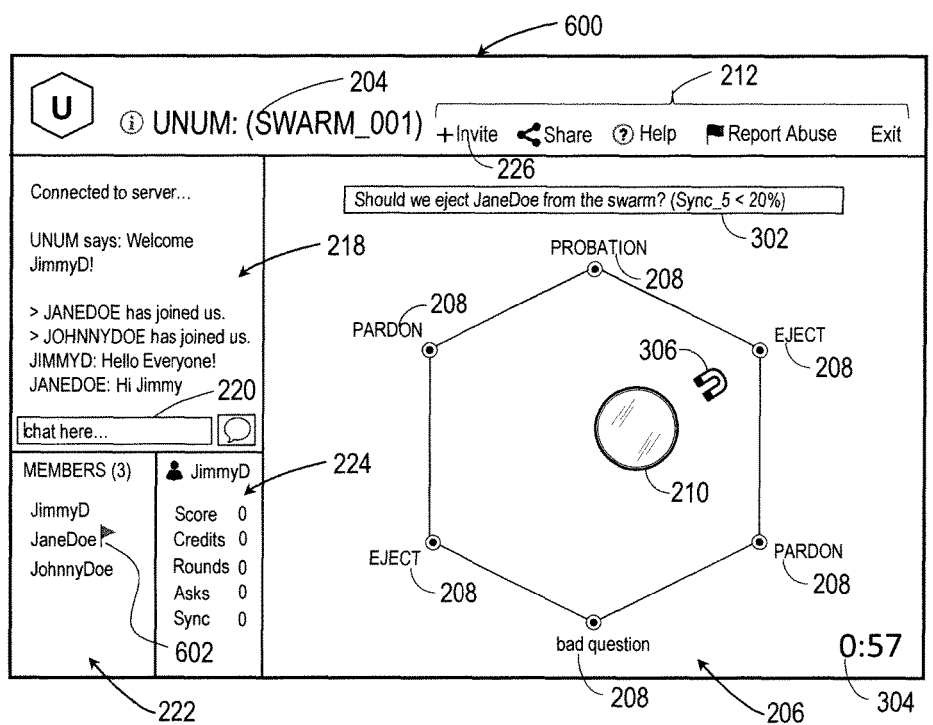
FIG. 6 is an exemplary display interface during a collaboration session determining whether to eject a specific member from the group.

Referring next to FIG. 6, an exemplary display interface 600 is shown during a session determining whether to eject a specific member from the group. Shown are the prompt bar 202, the group name 204, the target area 206, the plurality of input choices 208, the pointer 210, the communication menu 212, the chat window 218, the chat input box 220, the current member list 222, the statistics display 224, the invite button 226, the question display 302, the countdown clock 304, the magnet icon 306, and the flag icon 602.

Each group is configured to be able to eject or purge members of the group who consistently show low user synchronicity values over a certain number of sessions. In current embodiments, the determination is based on a user's average user synchronicity value over the last 5 sessions (referred to herein as that user's "Sync_5" synchronicity value) In the true spirit of collaboration, "banishment decisions" are posed to the group itself, which uses collaborative motion of the pointer 210 to decide if an identified low-performing member should be banned for low performance. The benefit of using the Sync_5 user synchronicity value is that users are not punished for a single divergent answer, or even a few divergent answers, but a string of them. This helps to differentiate between users who just disagree with a single question versus users who are deliberately being obstructionist to the swarm's overall performance. In some embodiments, the Sync_50 is also computed, which is the time average of the user's user synchronicity value over the last 50 session. This value is used in combination with the Sync_5 user synchronicity value when ejecting users from the group. This allows users to rewarded for long-term collaborative behavior. The Sync_5 user synchronicity value and the Sync_50 user synchronicity value are effective, but obviously values averaged over a different number of sessions could be used by the CCS 102 software. The key is for the software to assess a time-history of the user's user synchronicity values when determining banishment (or suggested banishment). Similarly, entry into the group can require that the user's Sync_5 user synchronicity value and/or Sync_50 user synchronicity value be above a defined threshold. This allows some groups to be highly selective, only allowing users with a track record of being collaborative members.

In fact, the present invention enables the user to create a new group by giving the new group a name, assigning it a theme, and including a description of the new group's intent and/or philosophy. In addition, the user creating the new group can assign an entry threshold value that indicates a level of historic user synchronicity value that an individual user must attain to gain access to the new group. In some embodiments the Sync_50 user synchronicity value is used. In such embodiments, the group creator might indicate that only users with a Sync_50 greater than 35% can enter the new group. This ensures that deliberately obstructionist users (based on historical performance) can't enter. The system of the present invention enables a virtual lobby interface 800 included in the display interface, the virtual lobby interface 800 indicating a plurality of distinct groups for users to join, each of the plurality of groups having a different entry threshold, or optionally no entry threshold. This enables selective groups and open groups. Users who want to have access to selective groups are thereby motivated to perform collaboratively when using the system.

Shown in FIG. 6 is an exemplary user display interface that supports the purging methodology described herein. In this example, the CCS 102 has identified that a member of the group has been assigned a Sync_5 user synchronicity value below the pre-assigned threshold (for example, a user synchronicity value below 20%). In response to this automated trigger, the CCS 102 software sends an automated question to all members of the group, asking if the low-performing member should be purged from the group.

More specifically, the question automatically posed to the group by the CCS 102 includes the unique user name of the low performing member ("JaneDoe" in the exemplary session) and an indication of the threshold that was fallen below ("Sync_5<20%" in the exemplary session). The members of the group then engage in the collaborative session, providing input in real-time that is numerically combined into the group intent. In this example, the CCS 102 software automatically sent each member of the swarm a target area including the input choices 208. In this example the set of six input choices 208 includes: "eject", "pardon", "probation", "eject", "pardon", and "bad question". The users then collaboratively provide input, enabling the swarm intelligence to converge on the target answer. If the answer is "eject", the identified user is ejected from the swarm and banned from re-joining the group for either a set amount of time, a set number of sessions, or until his or her user synchronicity value rises above the threshold level. The virtual lobby interface is described further below in FIG. 8. If the answer is "pardon", the identified user is excused of his divergent behavior and is allowed to remain in the group at the present time. If the answer is "probation", the CCS 102 software is configured to monitor the future user synchronicity values for that user, giving that user a defined amount of time (or defined number of session) to raise his user synchronicity value above the defined threshold. For example, the user may be required to get his Sync_5 user synchronicity value above 35% within the next ten sessions, or ejection of that user will automatically be executed by the CCS 102.

In some embodiments, one user of the group can initiate a purge session by clicking on a particular user's username (as shown in the list of current members) and selecting a "purge user" option from the board selection drop-down menu 214. In preferred embodiments, this can only be done if the user synchronicity value or other measure of performance of the user to be purged has fallen below the threshold value. In some such embodiments, the flag icon 602 appears in the list of current members next to the usernames of users whose user synchronicity value fell below said threshold, thus alerting the other members of the low performance, and alerting the other users that such "red flagged" users can be selected for possible purge question put to the group. As shown in FIG. 6, in the list of members the user JaneDoe has the flag icon 602 shown next to the username, indicating that user JaneDoe has the user synchronicity value below the threshold.

In some embodiments, the CCS 102 does a periodic purge that does not identify the specific username of the potentially purged user when posing the question to the group. For example, in one such embodiment, the CCS 102 automatically sends the question—"Should we purge the lowest performing member of the group?" The group must now respond. The dynamic is interesting because members of the group do not know if they are the lowest performing member. In some such embodiments, such purge sessions are triggered at regular time intervals. In other embodiments, such purge sessions are triggered when the group cohesiveness score falls below a threshold. This is highly effective because the group cohesiveness score is a representation of how collaboratively effective the group is. If the group is not being highly collaborative, as indicated by the low group cohesiveness score, it's a very effective technique for the CCS 102 to ask the group if it wants to eject its lowest performing member as a means of boosting performance. In large group, the CCS 102 can be configured to ask "Should we PURGE the lowest performing 10% of our members?" This enables the swarm to purge many members at once if they are not performing well. Again, the dynamic is quite interesting and engaging for users because they don't know if they are among the lowest 10% that will get purged. In this way, the swarm can self-moderate itself, enhancing its own configuration for optimal performance, with assistance from the automated agent of the CCS 102 software.

Figure 7:
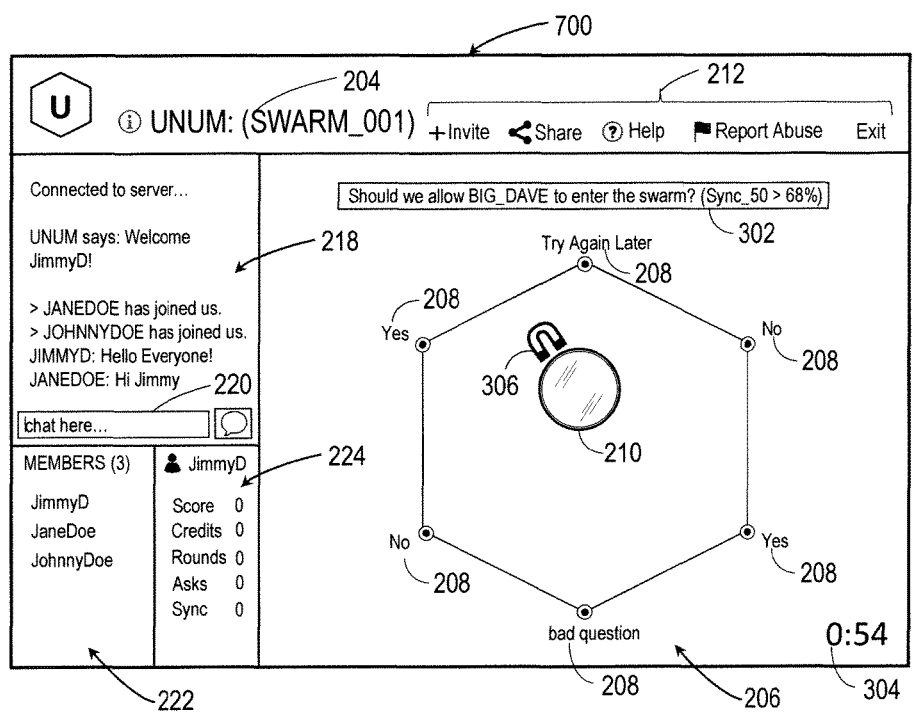
FIG. 7 is an exemplary display interface during a session determining whether to allow a specific member to join the group.

Referring next to FIG. 7, an exemplary display interface 700 is shown during a session determining whether to allow a specific member to join the group. Shown are the prompt bar 202, the group name 204, the target area 206, the plurality of input choices 208, the pointer 210, the communication menu 212, the chat window 218, the chat input box 220, the current member list 222, the statistics display 224, the invite button 226, the question display 302, the countdown clock 304, and the magnet icon 306.

In some embodiments of the present invention, the collaborative group is not only empowered to make collaborative decisions about ejection from the swarm, but is empowered to make collaborative decisions about entry into the swarm. In such embodiments, the swarm can be configured when created to be "swarm admit only" in which case, users must be collaboratively granted access. This designation (or similar designation) is displayed in the system lobby display. If the swam is identified in the lobby display as "swarm admit only", the user may not immediately join the group, but the user may select a displayed button marked "knock". When a user knocks on a swarm (i.e. selects the knock button, whereby an indication is sent to the CCS 102 indicating that that user is requesting to join that particular group), the CCS 102 software is alerted that the user wants to enter that particular swarm and because that swarm is listed in the CCS 102 database as being "swarm admit only", the CCS 102 software executes a routine that puts the admission question to the group. The swarm intelligence can then collaboratively decide if it wants to allow the given user to join, or reject the request for admission.

As shown in FIG. 7, the CCS 102 has received an indication that the user BIG_DAVE has indicated that he or she wishes to enter the group "Swarm_001". Further, responsively the CCS 102 determined that the group Swarm_001 has been configured as "swarm admit only". In response to these conditions, the CCS 102 performs the automated routine in which it sends the question to the current users in group Swarm_001, asking if the user should be allowed to join the swarm.

More specifically, the question automatically posed to the swarm by the CCS 102 includes the unique username of the user requesting entry into the group ("BIG_DAVE") as well as an indication of that user's historical collaborative performance ("Sync_50=68%"). In some embodiments, a user rank is used instead of the user synchronicity value, indicating where that user's performance falls within the overall spectrum of users of the system. In some embodiments the CCS 102 determines an ordered rank of a plurality of users based at least in part upon at least one synchronicity value associated with each of the plurality of users. In some embodiments the CCS 102 determines an ordered rank of a plurality of groups based at least in part upon at least one group cohesiveness score associated with each of the groups In addition, the CCS 102 might provide a link to further stats or information about that user, possibly including a link to his or her Facebook® page or Twitter® handle. In this way, the members of the swarm can assess who this user is, and how collaborative this user has been during his prior participation within the system.

The current members of the swarm SWARM_001 then engage in the collaborative control process, providing input in real-time that is numerically combined into a singular intent of the swarm intelligence, as shown by FIG. 7. In this example, the CCS 102 software automatically sent each member of the swarm a set of input choices 208 related to allowing user entry to the group. In this example the set of six input choices 208 includes: "no", "yes", "not now", "yes", "no" and, "bad question". The users then collaboratively engage, enabling the swarm intelligence to converge on the target input choice 208. If the target is "yes", the identified user is granted entry into the swarm. If the target is "no" the identified user is not granted entry into the swarm. If the target is "not now" the identified user is informed by the CCS 102 software: "maybe . . . try again later." In this way, the collaborative swarm intelligence can control its own population, deciding who is granted entry and who is rejected. This, combined with the ability to purge members, allows for a dynamic optimization of the swarm's overall makeup, both through automated processes and by direct swarm intelligence control.

As also disclosed herein, the swarm can be configured to dynamically adjust the group configuration, not only by selectively ejecting users from the swarm and/or admitting members to the swarm but by adjusting the relative weighting of the input received from current members of the swarm. More specifically, in some embodiments, dynamic algorithms are used to increase the weighting that certain users have upon the collective pull of the pointer 210, while decreasing the weighting that other users have upon the collective pull of the pointer 210.

More specifically, the CCS 102 can be configured to compute and store a weighting value for each user, based on that user's historic user synchronicity values. Users who show a time history of high user synchronicity values are assigned a positive weighting value, while users who show a time history of low user synchronicity values are assigned a negative weighting value. These weighting values are updated regularly by the CCS 102, ideally after each session that a user participates in, because the user's performance during that session likely resulted in a change in his historic user synchronicity value. In this way, the swarm intelligence is adapted over time, strengthening the connections (i.e. input weighting) with respect to the more collaborative users in the swarm, and weakening the connections with respect to the less collaborative users in the swarm. Hence, the collaborative swarm is dynamically adjusted in an innovative manner reminiscent of the neural networks within biological brains that optimizes its intelligence by adjusting connections.

In one specific embodiment, the CCS 102 computes the Sync_5 user synchronicity value and Sync_50 user synchronicity value for each user, based on the user's performance during multiple sessions. For example, the user might have participated in 50 sessions as a member of multiple groups. Thus the Sync_50 user synchronicity value that is stored and updated on the CCS 102 (and related database) is swarm-independent.

When inside a particular group, the CCS 102 computes the weighting value for that user based on his Sync_5 user synchronicity value and Sync_50 user synchronicity value (reflecting the user's user synchronicity value over the last 5 and last 50 questions respectively). In one such embodiment, the weighting value is computed as follows:

$$\text{User Weighting} = 0.04*(\text{Sync\_50}-50)/50 + 0.06*(\text{Sync\_5}-50)/50$$

This equation assigns a weighting value that's 40% dependent upon the user's Sync_50 user synchronicity value and 60% dependent upon the user's Sync_5 user synchronicity value, thereby giving greater importance to the user's more recent behavior, but still considering the longer term behavior of that user. Further, this equation is structured mathematically such that users who earn user synchronicity values at or near a neutral performance level of 50% have no change in weighting, and users who have user synchronicity values much higher than the neutral value of 50% have a higher weighting, this higher weighting value topping out at +10%. Users with user synchronicity values substantially below 50% are computed to have a negative weighting value that maxes out at −10%.

In this way, across a population of users, most will have close to the neutral weighting value at or around 0%, but those users who have shown a very high capacity for collaborative behavior can earn a boost in their weighting value up to +10%, while those who have shown a high tendency for obstruction can be penalized with a drop in their weighting value of as much as −10%. While the spread from −10% to +10% does not seem that significant, it means that a high performing user will easily overpower the input from a low performing user, tipping the converge trend towards the more collaborative members. (It should be noted that weighting values could be defined with a larger range, for example −20% to +20%).

In addition to the processes that allow the group to adapt over time, changing the dynamics by which questions are collaboratively answered, the present invention includes one or more user-selectable mode when asking a question that also changes the dynamics of the collaborative answer. For example, the present invention includes a user selectable mode called "gravity mode" that is accessible from the physics selection drop-down menu 216. The gravity mode is engaged during the session such that the pointer 210 experiences the restoring force that pulls the pointer 210 back to the point substantially centered among the plurality of the given input choices 208, the restoring force a function of distance from the center.

This creates a new collaborative dynamic in which members of the group must provide user input with a collective force that overcomes gravity in order to position the pointer 210 on one of the plurality of input choices 208. This significantly alters the swarm dynamics, for it now requires more than a simple plurality of users providing input to the pointer 210 in a substantially synchronized manner in order to position the pointer 210 on the target. In the standard non-gravity mode, if there were 100 users, with 51 pulling towards one answer, and 49 pulling towards another, the 51 would likely be able to position the pointer 210 on the desired target. But with gravity of sufficient restoring force, the system can be configured to require that at least 80% (i.e. 80 users of the 100 in the group at the present time) are pulling in a substantially similar direction to overcome gravity and position the pointer 210 on the desired target. This mode thus enables a high barrier for collaborative decision making, requiring the group to have more "conviction" in the resulting response.

In some embodiments, the level of gravitational force is user-selectable, thereby adjusting the level of conviction required to overcome gravity and reach the target answer.

Figure 8:
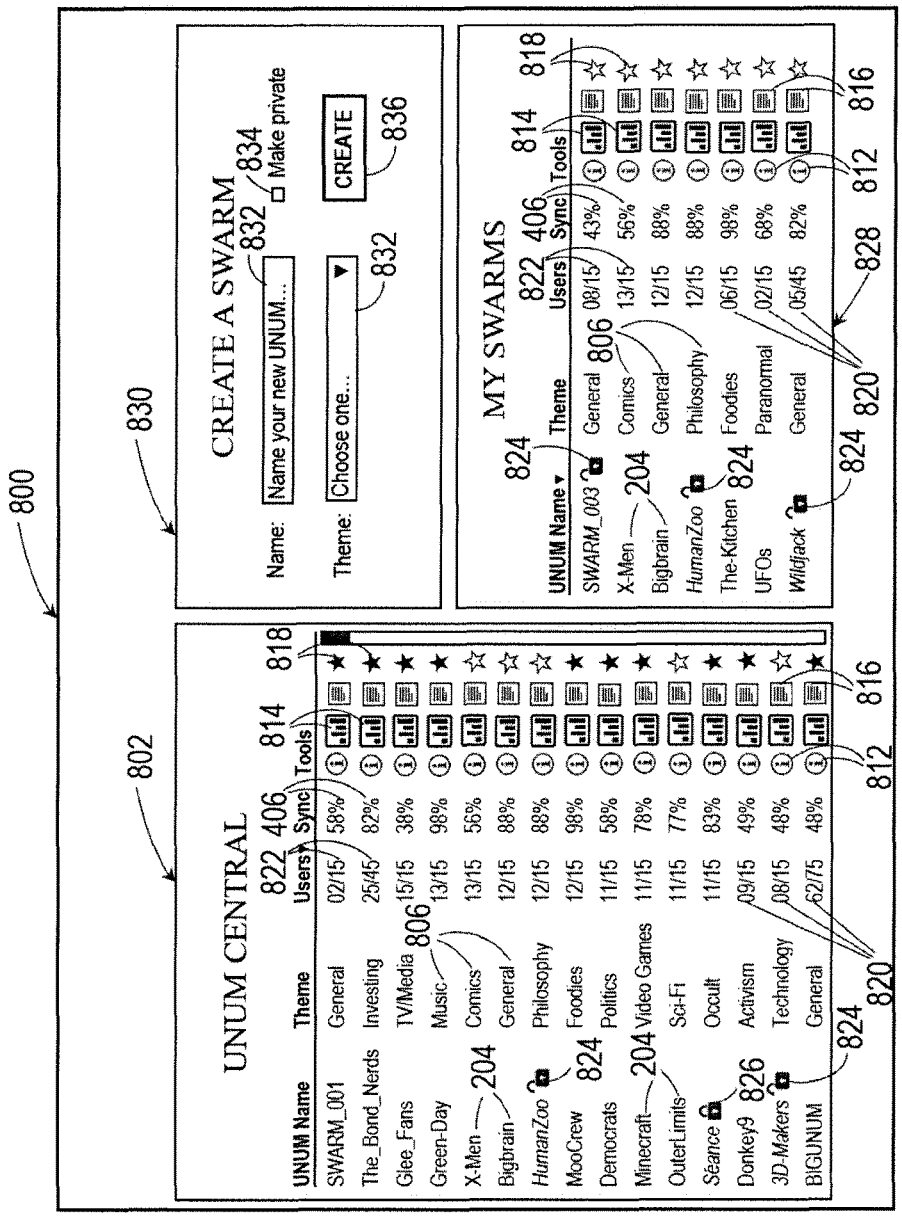
FIG. 8 is an example display interface of the virtual lobby interface.

Referring finally to FIG. 8, an example display interface of the virtual lobby interface 800 is shown. Shown are a group directory 802, the plurality of group names 204, a plurality of group themes 806, a plurality of group cohesiveness score indications 406, a plurality of information icons 812, a plurality of statistics icons 814, a plurality of log icons 816, a plurality of favorites icons 818, a number of users in the group 820, a plurality of maximum number of users 822, a plurality of unlocked icons 824, a locked icon 826, a favorites section 828, a swarm creation section 830, a plurality of user input areas 832, a make private selection box 834, and a create button 836.

The virtual lobby interface 800 is accessible to computer users on computing devices 104 either through the CIA running on their computing device 104, or through a standard web browser (if the virtual lobby interface 800 is created as a standard html webpage). As shown in FIG. 8, the virtual lobby interface 800 includes the group directory 802 of available groups that users can join and then participate in real-time collaborative intelligence processes. The virtual lobby interface 800 is not real-time, but employs more traditional methods known to the art when joining chat rooms. The virtual lobby interface 800 is divided into a number of sections. One section is the group directory 802 labeled as "UNUM Central". Using the group directory 802, users can browse the available groups, each of said groups being associated with a theme that governs the type of questions that users will ask.

The group directory 802 in the embodiment shown comprises a table, with a row for each group included in the directory. Information included in the row for each group includes the group name 204, the group theme 806, the current number of users in the group 820, the maximum number of users 822, and the current group cohesiveness score. The group theme 806 is a general description of the area of focus for the group, for example, investing, music, politics or technology.

If the group cohesiveness score is low, users may not want to enter that swarm because it means the group is not being highly collaborative. The low group cohesiveness score impacts the enjoyability of the session as well as limits the scores (credits) that users can earn.

Also included in the row for each group is a plurality of tool icons. Included in the tool icons of the exemplary lobby interface 800 of FIG. 8 are the information icon 812, the statistics icon 814, the log icon 816, and the group member icon. When the user selects the information icon 812 for one group, a display of additional information about that swarm is shown. When the user selects the statistics icon 814, a display of statistics of the group is shown. Statistics may include a number of questions asked by the group during one or more periods of time, an average number of users that participated in the group during one or more periods of time, and the average group cohesiveness of the group during one or more periods of time. The average group cohesiveness may be determined by finding the mean of a series of repeated group cohesiveness scores over a specific period of time. In some instances the mean is time-weighted such that time-steps near the end of the time period are more heavily weighted than time steps near the start of the time period. In some embodiments the period of time may comprise a plurality of completed question-and-answer sessions.

When the log icon 816 is selected by the user, a display of a log prior questions and answers of that swarm is displayed. The log display has been disclosed in the related applications. The log display may optionally include the ability not just to see the questions and answers, but also access the replay of those questions and answers. To achieve this, the CCS 102 archives not just a history of questions and answers for each swarm, but archives the replay data associated with each of said questions and answers. In some preferred embodiments, the replay data includes locative data for the pointer 210 and each of the magnet icons 306, said data stored at regular time intervals over the period of a response to a question. For example, pointer location coordinates along with magnet icon 306 positions, orientations, and size data may be stored every 0.25 seconds during the period of the response to the question. In addition, data related to the pointer 210 being over input choices 208 may also be stored. In some preferred embodiments, magnet icon data is stored relative to pointer 210 location, for example as a distance vector from the center of the pointer 210, the distance vector having a size and orientation relative to the center of the pointer 210.

The favorites icon 818 indicates which of the groups are included in a "favorites" list. In one embodiment the favorites list includes groups that user has selected as favorites, groups that have been created by the user, and private swarms that the user has been invited to. For the groups shown in the portion of the group directory 802 displayed in FIG. 8, the groups includes in the user's favorites are X-Men, Bigbrain, HumanZoo, OuterLimits, and 3D-Makers groups, as indicated by the highlighted (white) star icon. Groups not included in the user's favorites list are indicated by the unhighlighted (black) star icon.

Some groups displayed in the group directory 802 are configured to have limitations to group membership, as previously described. These groups are indicated by either the locked icon 826 or the unlocked icon 824 next to the group name 204. In the group directory 802 portion shown, the HumanZoo and 3D-Makers groups include the unlocked icon 824, indicating that it is currently possible to join those groups if the membership limitations are met. The Séance group includes the locked icon 826, indicating that it is not possible to join that group at this time.

The locked icon 826 may be displayed for one of a plurality of reasons, for example—the swarm may be locked because it is private and requires an invitation or password to be joined by the user. The swarm may be locked because it has an entry threshold such that users must have scores and/or statistics related to their historical performance that are above the entry threshold to be granted access. The swarm may be locked because the swarm is configured to require group approval for new users joining. The swarm may be locked because it has reached its real-time group size limit and thus cannot accept any additional users at the present time.

As also shown in FIG. 8, the swarm creation section 830 allows users to create their own swarm. By entering information into the user input areas 832 of the swarm creation section 830, and then selecting the create button 836, the user can define the name of a new swarm, give the new swarm a theme, and optionally make the new swarm a private swarm that requires a password, by selecting the make private selection box 834. In some embodiments, users are further given the ability to invite their friends to the new swarm by accessing their Facebook® friends and/or Twitter® followers.

As also shown in FIG. 8, the favorites section 828 of the display interface allows users to track swarms that are of particular interest to them. The favorites section 828 comprises a table including the swarms included in the user's favorites list. The favorites section 828 is formatted similarly to the group directory 802 table, including the UNUM name, theme, number of users 820, maximum number of users 822, and icons 812, 814, 816, 818 for each swarm included in the favorites section 828. The favorites section 828 may also include the locked icon 826 or the unlocked icon 824 for the group, as applicable.

In this way, the present invention allows users to enter swarms, exit swarms, and create swarms. The historical performance for users (for example their score, credits, ranking, rating, and synchronicity values) are maintained by the CCS 102 for participation across all swarms. Thus a user can earn points by participating in a variety of swarms, public and private, although they can only be in one swarm at a time. That's because swarms require real-time participation.

In addition to defining the name, theme, and password of a given swarm, users are given the ability to configure new swarms by setting parameters that indicate: (a) whether the new swarm is private or public, (b) whether the new swarm supports adaptive weighting or all users should always have equal weighting, (c) whether the swarm supports automated purging or the purging of users should always be user initiated, (d) whether the swarm is supports "swarm admit only" or anyone can join the swarm without the swarm intellect making an assessment, (e) whether the swarm supports an entry threshold and if so, what level it should be, (f) whether the swarm supports an ejection threshold and if so, what the level should be. In addition, each swarm can be linked to one or more official Twitter® accounts, for the sending of Tweets that represent the official voice of that swarm intelligence.

As will be described herein, novel methods have also been developed for assessing the behavior of a collective intelligence as it makes real-time decisions. More specifically, a unique methodology called "faction analysis" is disclosed that provides analytic insights into the decision-making process of networked users as they work together in real time as a unified dynamic system. In many embodiments disclosed herein, the collective intelligence makes decisions in response to a presented prompt, each decision being enacted through the selection of one solution from a set of presented solutions. For example, a set of six potential answers is displayed to a plurality of networked users along with a textual prompt. The answer options and prompt are presented to the plurality of networked users in substantial simultaneity by a computer local to each of said users. By engaging a user interface associated with each of the separate local computers, the plurality of networked users work together as a unified dynamic system, collectively moving the graphical puck 210 (also referred to as the pointer) from one displayed starting location to one displayed target location associated with one of the six input choices 208 (also referred to as answer choices). In this way, the group of networked users make a real-time decision as a collective intelligence, selecting an answer to the displayed prompt.

As previously described, the time period from just before the puck 210 starts moving until the puck 210 lands upon (and selects) one of the provided answer choices 208 is referred to herein as the decision period. During the decision period, each of the plurality of users in the collective intelligence influences the motion by imparting his or her own personal intent regarding the motion of the puck 210 at repeated moments in time (i.e. continuous time steps). In some preferred embodiments, users do this by manipulating the graphical magnet icon 306, the location and orientation of the magnet with respect to the puck 210 defining the magnitude and direction of the force-vector to be applied to the puck 210 at that moment in time. The resulting motion of the puck 210 is determined not by the force vector associated with any single user, but by the plurality of force vectors imparted by the plurality of users in synchrony. In this way, a plurality of users can view a textual prompt in unison and then collectively select one answer of a plurality of optional answers as a unified dynamic system.

Thus the present invention allows a plurality of networked users to form a system that makes decision in much the same way that a biological brain makes decisions. The decision-making mechanism in a biological nervous system is described as "a competition between mutually interacting populations of excitable units (i.e. neurons) that accumulate noisy evidence for alternatives and when one population exceeds a threshold level of activity, the corresponding alternative is chosen" (science.1210361). The present invention allows this same decision-making process to occur, not by connecting a plurality of neurons into a brain, but by connecting plurality of brains into a larger structure referred to herein as a "hyper-brain". And just like a brain displays greater intelligence than the neurons that comprise it, we would expect a hyper-brain to be a more intelligent than the brains that comprise it. In fact, testing of the present invention reveals that the resulting Collective Intelligence produces insightful answers and accurate predictions, often exceeding the abilities of any of the participating users.

Thus, the present invention enables a system of networked users to combine their noisy and disparate input in real-time, producing a rapid and definitive decision. Once a decision is made by the system of users, it is desirable to analyze how that decision was arrived at from the noisy collection of inputs. More specifically, when the decision involves a group of users selecting one answer from a plurality of options, it is often the case that the decision process involves factions of users pulling towards each of the plurality of different options. How those factions form and dissolve over the decision period has been identified by the present inventor as an informative metric for analyzing the decision process. This is because decisions often involve the group exploring a range of options that result in stalemates until finally converging on a solution that gains enough support from the collective to be selected. Stalemates occur when the factions pulling towards different options impart force vectors that balance to a net force of zero or nearly zero. Such stalemates (also referred to as deadlocks) are only resolved if one or more of the users changes his or her pull from one option to another. In other words, deadlocks are resolved if one or more users defects from one faction to another.

Because the system may include a large number of users working together to move the puck 210, it's often the case that many users change factions at any moment in time during the decision period. This enables a complex negotiation among all the participating users, everyone pushing and pulling, trying to find a solution that best satisfies the collective will of the unified system. It's this complex real-time negotiation that produces optimized results, converging on solutions that very often maximize the satisfaction of the collective as a whole.

What is needed, therefore, is an analysis method that allows for the representation and assessment of factions as they form and dissolve during a collective intelligence decision making process. The present invention provides such analysis. The present invention also enables faction assessments to be visualized. While the present invention is described herein by embodiments in which one option being selected from a set of six options (input choices 208), these methods can be extended to greater or fewer numbers of options, arranged in a variety of spatially layouts. And finally, as used herein, the phrase "in synchrony" means substantially simultaneously within the limits of human perceptual and motor abilities.

As previously described herein, and also in the related applications by the present inventor, which are incorporated by reference, methods and systems for enabling the real-time closed-loop collective intelligence among the plurality of networked users is disclosed. The methods and systems enable the plurality of networked users to participate in a real-time process in which the question or other textual prompt is presented in substantial simultaneity to each of the networked users on each of the plurality of local (portable) computing devices 104. In addition to the prompt, the set of possible responses to be selected among is presented to each of the networked users on each of the plurality of local computing devices 104. The local (portable) computing devices 104 are in communication with the central collaboration server (CCS) 102 that coordinates the synchronous display of questions and choices to the plurality of users by the plurality of local computing devices. The system and methods of the present invention enable the plurality of networked users to respond to the prompt as a unified dynamic system, collectively selecting one response from the set of possible responses. In many embodiments, the users do this through real-time closed-loop control of the collaborative pointer 210 in which the plurality of users work in synchrony to move the pointer 210 from a starting location to a location associated with the selected response. In many preferred embodiments, the users impart their individual intent with respect to the motion of the collaboratively controlled pointer 210 by positioning a graphical magnet that defines the magnitude and direction of a user intent vector. The CCS 102 receives the plurality of user intent vectors and determines the group intent vector (or equivalent resultant) that influences the motion of the collaboratively controlled pointer 210 in real-time.

In this way, the present invention enables the plurality of users to work together as the real-time closed-loop collaborative intelligence that expresses a singular group intent that can answer questions, make decisions, or otherwise provide collective responses to a textual prompt. The methods intervening software and hardware to moderate the process, closing the loop around the disparate input from each of the many individual participants and the singular output of the group. In many embodiments, each individual user ("participant") engages the user interface on the computing device 104, conveying his or her individual real-time intent with respect to the motion of the collaboratively controlled pointer 210, while simultaneously watching the real-time motion resulting from the group intent. This closes the loop around each user, for he is conveying individual intent while also reacting to the group's emerging will.

In the collective intelligence system as previously described, a time period from the start of a question period (e.g. when the word "GO" appears on the plurality of computers) to when the target is selected, is referred to herein as the decision period. During the decision period, the group of users works as a real-time dynamic system to move the puck 210 from the staring location of the selection. As disclosed herein, the unique analysis is performed by the Central Collaboration Server 102 (CCS) to determine how factions of users form and dissolve during the decision period. This analysis is referred to herein as the "faction analysis".

As defined herein, a "faction" is a sub-group of the plurality of users working as a unified dynamic system to answer a question by moving the collectively controlled pointer 210 from a starting location to a location associated with an answer (i.e. selecting a target). More specifically, the faction is a sub-group at a current moment in time who are all conveying User Intent Vector forces that aim to move the collectively controlled pointer 210 towards the same one of the plurality of answer choices 208. Thus, at a given moment in time during the decision period, the faction of users is defined herein as a sub-group of the total plurality who are applying individual user force vectors which aim towards the same choice of the plurality of available answer choices 208. If, for example, there are six available answer choices 208 (as shown around the hexagon of FIG. 2), then at any moment in time during the decision period, there could be as many as six different factions of users, each of said factions associated with (and pulling towards) a different one of the six different answer options. The present invention stores a representation of each of said factions in the memory of the CCS 102, the representation in memory indicating which user of the plurality of users is associated with each of the factions at various moments in time during the decision period.

Thus, for the present example that employs the hexagon board with six answer choices 208 for a given question prompt, the CCS 102 stores in memory a list of user identifiers for each of six factions for each of a plurality of discrete time-steps during the decision period. In an exemplary embodiment, the time step is a quarter second. Thus, four times per second, across the decision time, the CCS 102 stores the list of user identifiers in memory indicating which user is currently part of the six factions (i.e. pulling towards each of the six choice solutions). In addition, the CCS 102 stores in memory a "null faction" which includes a list of user identifiers for those users who are not currently pulling towards any of the six choices 208. Some of those users may be classified as "disengaged" for that time step, meaning they are not currently pulling on the puck 210 in any direction. This is likely because their magnet icon is not within proximity of the collectively controlled puck 210. Or it may be because the user is pulling on the puck 210 (via the magnet) in a direction that is not associated with any of the six factions, instead falling in a direction that falls between the direction associated with each faction. This will be made more clear with respect to the additional figures below.

Figure 9:
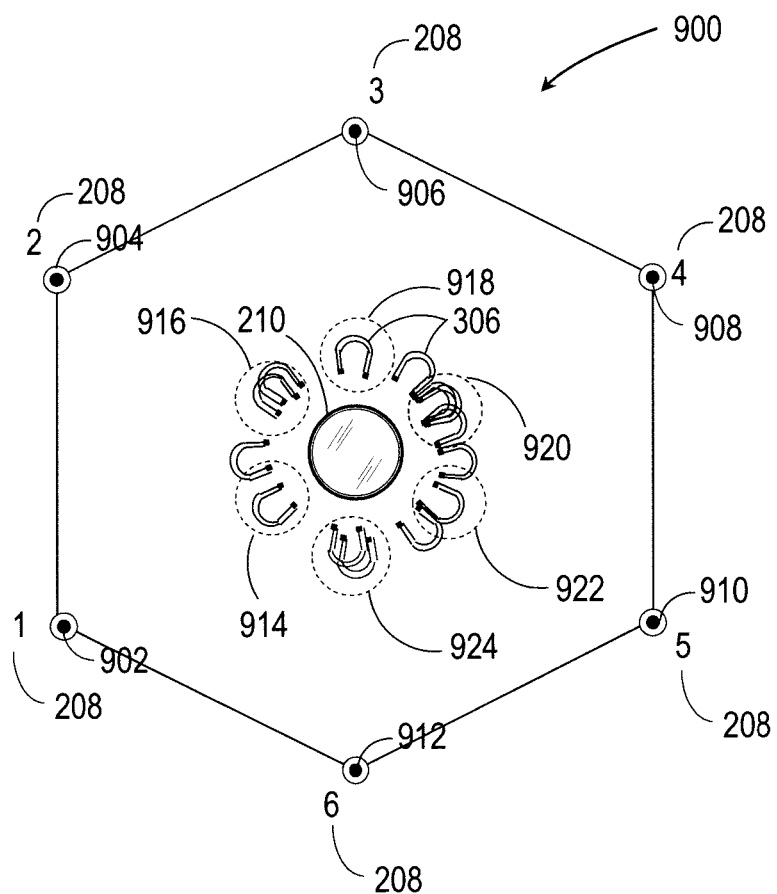
FIG. 9 is an exemplary first time step target area of an exemplary display interface shown at a first time step of an exemplary decision period.
Figure 10:
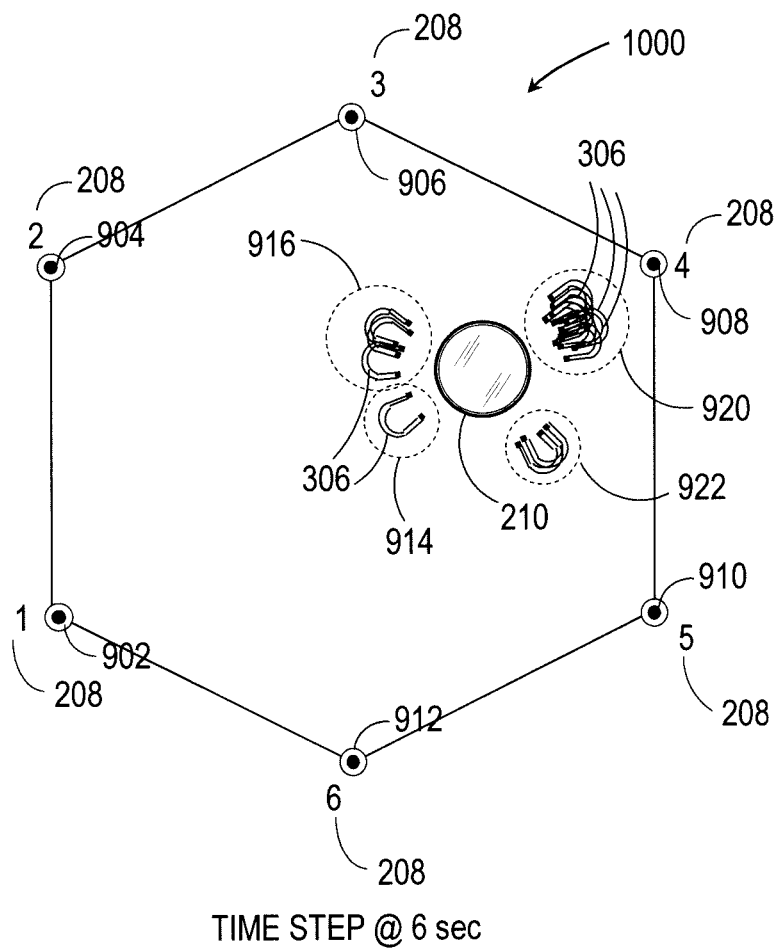
FIG. 10 is an exemplary second time step target area of the exemplary display interface shown at a second time step of the exemplary decision period.
Figure 11:
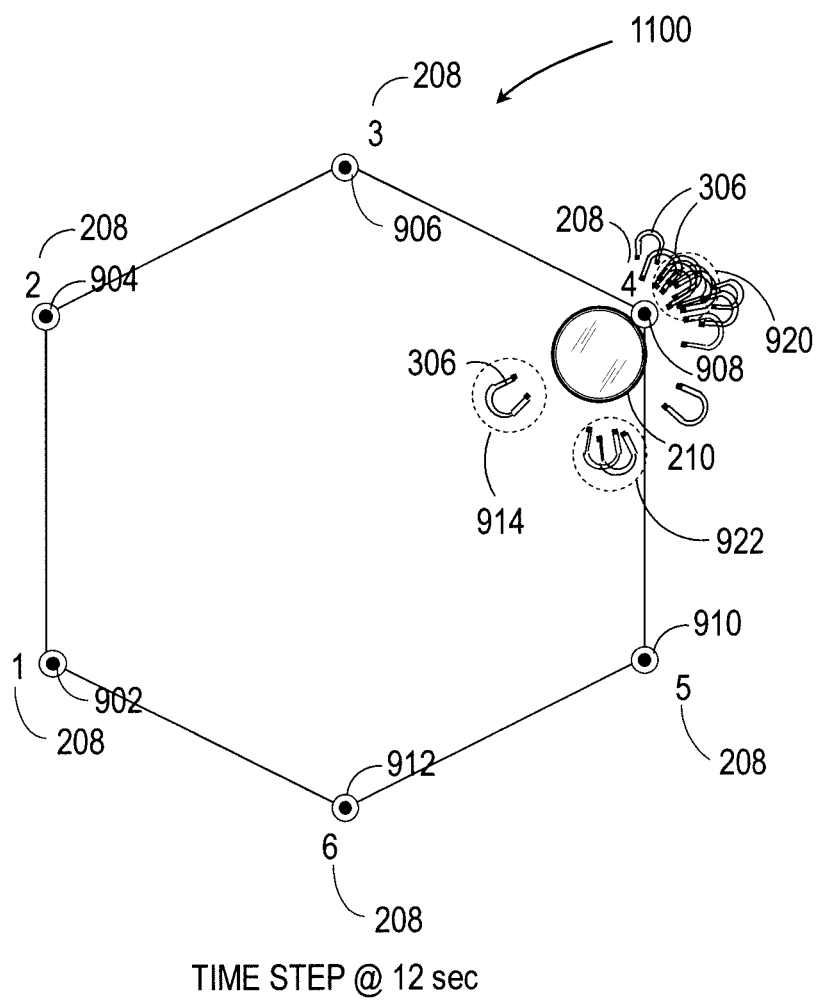
FIG. 11 is an exemplary third time step target area of the exemplary display interface shown at a third time step of the exemplary decision period.

Referring next to FIGS. 9-11, an exemplary target area is shown during three different time steps during an exemplary decision period. A first time step target area 900 is shown at s time step of 0 seconds elapsed since the start of the decision period. A second time step target area 1000 is shown at a time step of 6 seconds elapsed. A third time step target area 1100 is shown at a time step of 12 seconds elapsed. Shown are the pointer 210, the plurality of magnet icons 306, the plurality of answer choices 208, a first selection target 902, a second selection target 904, a third selection target 906, a fourth selection target 908, a fifth selection target 910, a sixth selection target 912, a first faction 914, a second faction 916, a third faction 918, a fourth faction 920, a fifth faction 922, and a sixth faction 924.

Each selection target 902, 904, 906, 908, 910, 912 represents a target location wherein the pointer 210 is moved under collective control to one selection target 902, 904, 906, 908, 910, 912 to select the corresponding input choice 208. Each faction 914, 916, 918, 920, 922, 924 corresponds to the same-numbered selection target 902, 904, 906, 908, 910, 912, i.e. the first selection target 902 corresponds to the first faction 914, etc.

FIGS. 9-11 show the three different time step target areas 900, 1000, 1100 depicting three different time step "snapshots" during the exemplary decision period in which a group of users are working as a unified dynamic system to answer a question as a collective intelligence. In the first time step target area 900, the question has just been asked, the word "GO" being displayed to the plurality of users on each of their computing devices 104. At this moment, the elapsed time during the decision period is 0 seconds. At this moment in time, all of the users who are participating are applying their initial pull on the puck 210 by positioning their individual magnet icon 306 near the puck 210, the position and orientation of their magnet icon 306 defining the user intent vector for that user. While each user may only see their own magnet icon 306 near the puck 210, the CCS 102 stores a representation in memory of all the magnets, which form a "swarm" around the puck 210 at each moment in time. The first time step target area 900 represents what the CCS 102 stores in memory, which is the location of the puck 210 and the location and orientation of each of the plurality of magnet icons 306 (representing each user intent vector), each magnet icon 306 controlled by one separate user on one separate computing device 104. Also shown is the layout of the answer choices 208 and selection targets 902, 904, 906, 908, 910, 912 around the hexagon shape. In this example the answer choices 208 are represented as numbers "1", "2", "3", "4", "5", and "6". It is understood that these answer choices 208 are generally words or phrases such as "Bill Clinton" and "George Bush", if the question involved selecting a former U.S. president. But, for clarity, numbers are shown here. The graphical selection targets 902, 904, 906, 908, 910, 912 are also shown.

As shown in the first time step target area 900, at zero seconds elapsed, i.e. time step=0 seconds, all of the participating users are ready to pull on the puck 210 in different directions. Many of those users intend to pull the puck 210 towards one of the six selection targets 902, 904, 906, 908, 910, 912 around the hexagon, as shown by the location of the plurality of magnet icons 306 shown in FIG. 9. What is needed, however, is a rapid analysis method to determine which users are pulling towards which answer choice 208 at each time-step during the decision period. What is also needed is a way to group users into "factions" such that factions can be tracked over time as they form and dissolve, their populations of users changing during the decision period.

To illustrate this, we can look at the first time step target area 900 and group magnet icons 306 which are "pulling" in a direction approximately towards one of the selection targets 902, 904, 906, 908, 910, 912 into factions 914, 916, 918, 920, 922, 924, each faction 914, 916, 918, 920, 922, 924 related to the corresponding selection target 902, 904, 906, 908, 910, 912. For example, in the first time step target area 900 one magnet icon 306 is included in the first faction 914, three magnet icons 306 are included in the second faction 916, one magnet icon 306 is included in the third faction 918, two magnet icons 306 are included in the fourth faction 920, one magnet icon 306 is included in the fifth faction 922, and one magnet icon 306 is included in the sixth faction 924.

The second time step target area 1000 shows the decision period at a later time step, wherein six seconds have elapsed since the start of the decision period. The combined group vectors have shifted the collectively controlled pointer 210 closer to the fourth selection target 908. In the second time step target area 1000 the magnet icons 306 have shifted, with seven magnet icons 306 (each magnet icon 306 representing one user) pulling towards the fourth selection target 908 and comprising the fourth faction 920, three magnet icons 306 pulling towards the second selection target 904 and comprising the second faction 916, two magnet icons 306 pulling towards the fifth selection target 910 and comprising the fifth faction 922, and one magnet icon 306 pulling towards the first selection target 902 and comprising the first faction 914. No magnet icons 306 are pulling towards (or approximately towards) the third selection target 906 and the sixth selection target 912, whereby there is no third faction 918 or sixth faction 924 for the current time step. As shown in the second time step target area 1000, the factions are consolidating, with the fourth faction 920 gaining support and no third faction 918 or sixth faction 924.

As shown in the third time step target area 1100 of FIG. 11, the decision period is shown at an even later time step, wherein twelve seconds has elapsed since the start of the decision period. The combined group vectors have shifted the pointer 210 even closer to the fourth selection target 908, and the fourth selection target 908 is very close to being selected as the target. The magnet icons 306 have shifted again as the users change their input during the decision period. Even though nine magnet icons 306 appear to be pulling towards or approximately towards the fourth selection target 908, only four magnet icons 306 are included within the fourth faction 920. Two magnet icons 306 are included in the fifth faction 922, and one icon is included in the first faction 914. The second faction 916, the third faction 918, and the sixth faction 924 have no magnet icons 306 are therefore not shown.

As shown in FIGS. 9-11, the grouping of magnet icons 306 in factions related to the selection targets 902, 904, 906, 908, 910, 912 changes over time. The criteria for determining which magnet icons 306 belong to a given faction is important, as seen in FIG. 11, where nine magnet icons 306 appear to be pulling towards the fourth selection target 908, but due to the faction selection criteria only four magnet icons 306 are actually included in the fourth faction 920.

What is needed, therefore, is an automated process wherein the CCS 102 software can make determinations quickly, and then associate each of the users pulling towards (or approximately towards) one of the answers in the appropriate faction at each of the plurality of time-steps during the decision period. To do this, a method is required that allows computer software to determine which users are part of which factions at each time-step.

Figure 12:
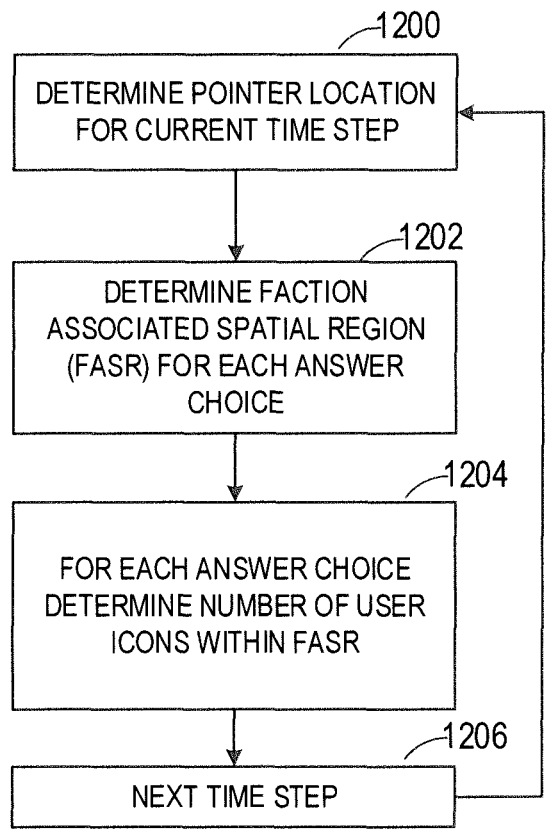
FIG. 12 is a flowchart diagram of a method of faction determination in accordance with another embodiment of the present invention.
Figure 13:
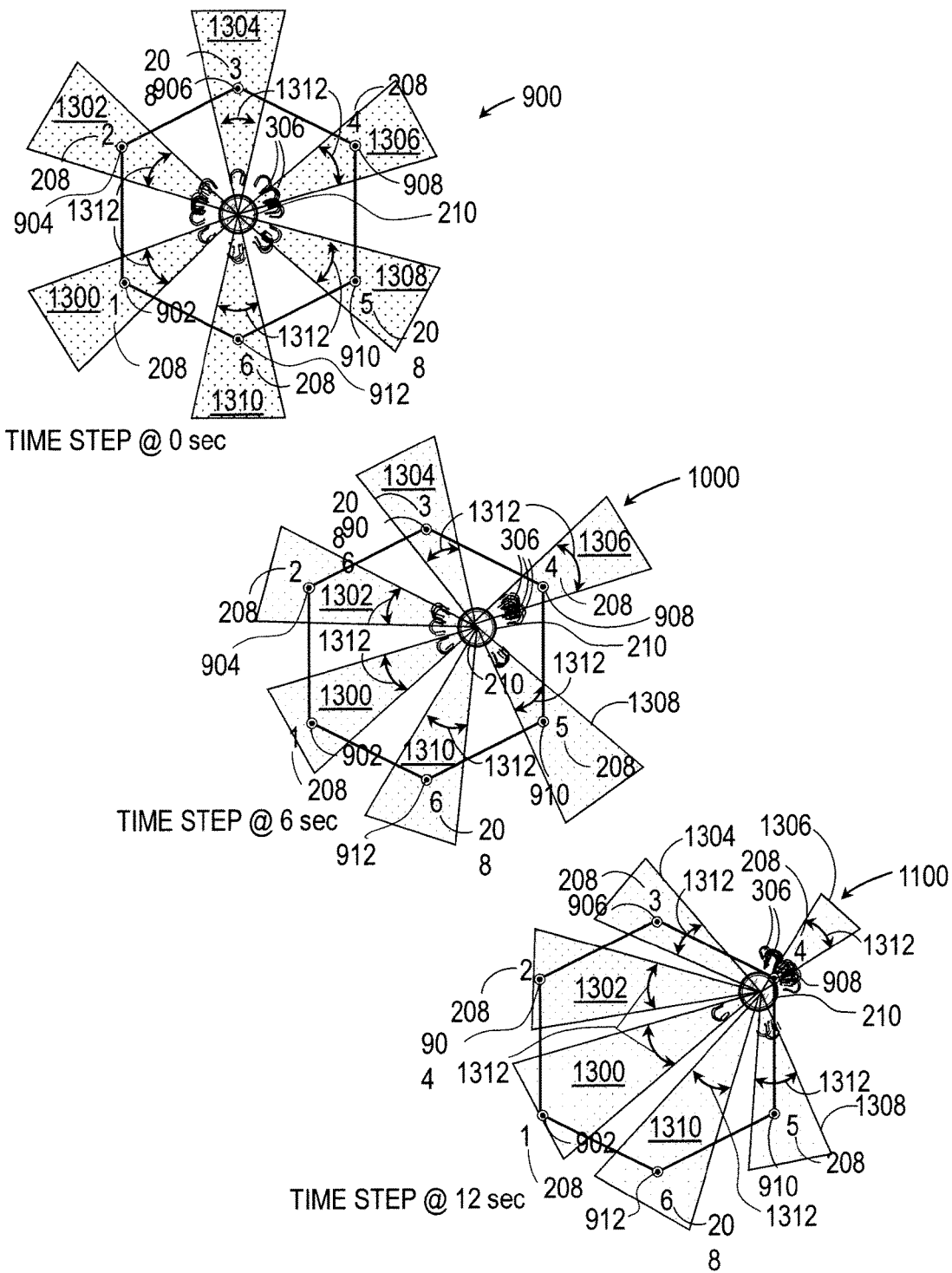
FIG. 13 is a plurality of time step target areas showing faction-associated spatial regions for three different time steps of the exemplary decision period, in accordance with a first embodiment of the method of faction determination of FIG. 12.

Referring next to FIG. 12, a flowchart of a novel method for performing faction analysis is shown. As described further below, the method of FIG. 12 may be applied in a first embodiment, described with respect to FIG. 13. FIG. 13 shows the plurality of time step target areas 900, 1000, 1100 showing faction-associated spatial regions at three different time steps of the exemplary decision period, in accordance with the first embodiment of the method of faction determination of FIG. 12.

Figure 14:
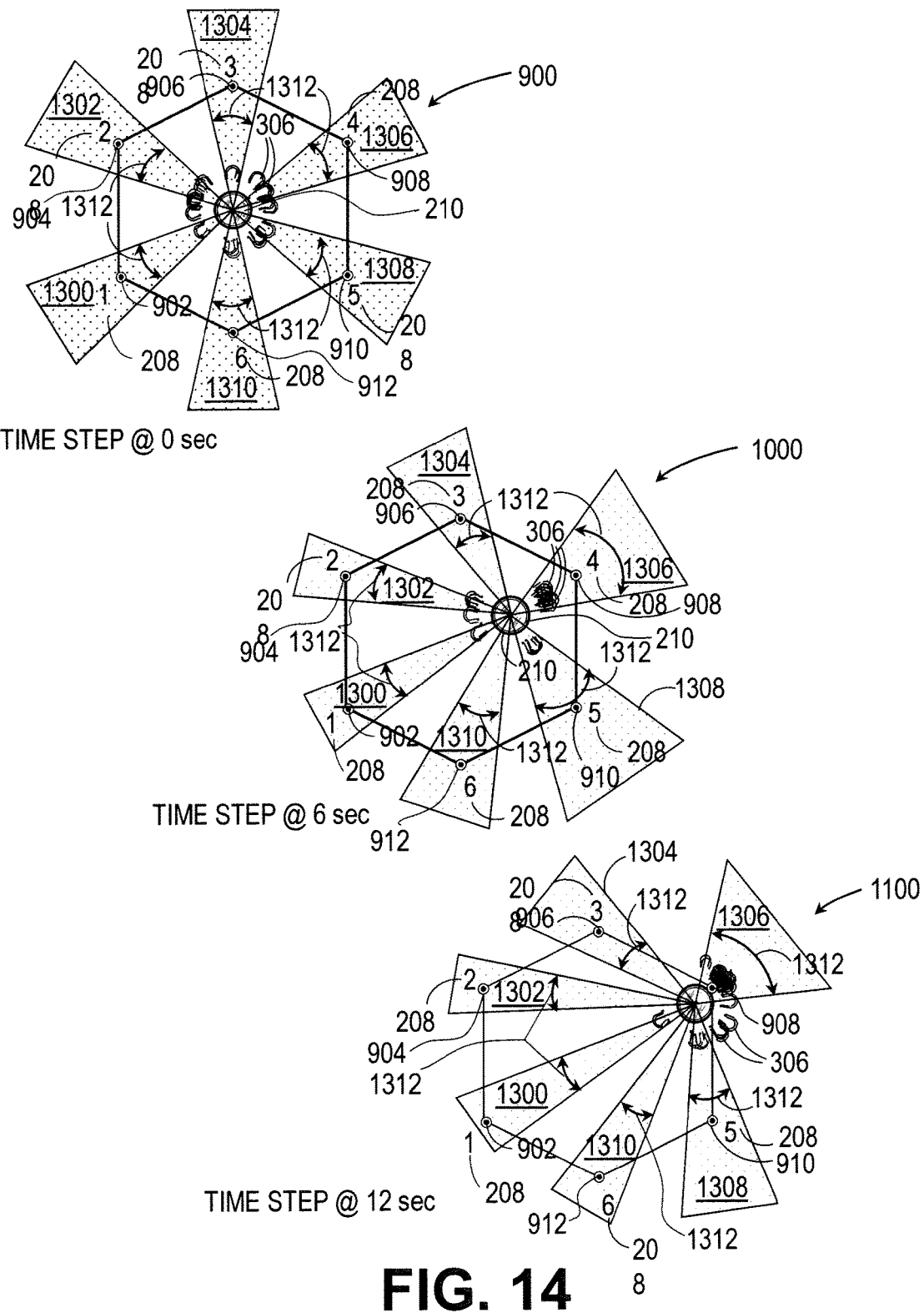
FIG. 14 is a plurality of time step target areas showing faction-associated spatial regions for three different time steps of the exemplary decision period, in accordance with a second embodiment of the method of faction determination of FIG. 12.

With respect to FIG. 13, the method is described that generates faction data but does not always accurately reflect the faction representation. FIG. 14 shows a second embodiment of the method of generating faction data which can more accurately reflect faction representation using a novel method.

Referring next to FIG. 12, a flowchart for a method of faction determination is shown in FIG. 12. In related FIG. 13, the target areas 900, 1000, 1100 of FIGS. 9-11 are shown including faction spatial regions in accordance with the first embodiment of the method of faction determination of FIG. 12. Shown are the pointer 210, the plurality of magnet icons 306, the answer choices 208, the plurality of selection targets 902, 904, 906, 908, 910, 912, a first Faction Associated Spatial Region (FASR) 1300, a second FASR 1302, a third FASR 1304, a fourth FASR 1306, a fifth FASR 1308, a sixth FASR 1310, and a plurality of vertex angles 1312.

The method for determining faction analysis data is described wherein the CCS 102 is configured to define a plurality of spatial regions, each spatial region associated with a unique one of the plurality of possible factions that user can join if pulling towards one of the plurality of available answer choices 208. These regions are called Faction Associated Spatial Regions (FASRs) and each FASR is indexed with respect to its associated faction (answer choice). Each FASR is shaped as a convex angular slice with the vertex of the angular slice at the center of the graphical puck 210, with the angular slice orientation such that the open end opposite to the vertex is centered on the selection target associated with that faction. In the first embodiment, the size of the vertex angle 1312 is approximately 30 degrees, i.e. approximately 15 degrees on either side of the corresponding selection target.

The exemplary target area shown in FIG. 13, which has six possible answer choices 208 (and corresponding selection targets 902, 904, 906, 908, 910, 912) and thus six factions, as a result there are six FASRs, each FASR associated with a faction that is pulling towards one of selection targets 902, 904, 906, 908, 910, 912 associated with the answer choices 208, denoted in FIG. 13 as "1", "2", "3", "4", "5", and "6". The FASR corresponding to answer choice 208 "1" is denoted the first FASR 1300, with the second FASR corresponding to answer choice 208 "2", etc. These six FASRs 1300, 1302, 1304, 1306, 1308, 1310 are depicted in the time steps shown in FIG. 13 as the shaded angular regions. For example, first time step target area 900 shows the fifth FASR 1308, which is an angular slice of approximately 30 degrees with its vertex at the center of the graphical pointer 210 and orientated aimed such that the open angle is centered directly on answer choice "5", which is the answer choice associated with faction 5. The other five FASRs 1300, 1302, 1304, 1306, 1310 are shown as well, pointing towards answer choice 208 "1", answer choice 208 "2", answer choice 208 "3", answer choice 208 "4", answer choice 208 "5" and answer choice 208 "6" respectively.

In the first pointer location step 1200, the CCS 102 determines the location of the pointer 210 for the current time step. The first time step target area 900 of FIG. 13 shows the first time step target area 900 at the time step occurring at 0 seconds, i.e. at the start of the decision period. The pointer 210 is located at the pointer start point, equidistant from all selection targets 902, 904, 906, 908, 910, 912.

In the next determine FASR step 1202, the FASR is determined for each answer choice. In the first embodiment shown in FIG. 13, as previously described the six FASRs 1300, 1302, 1304, 1306, 1308, 1310 are defined as the six angular regions (shown as shaded areas in FIG. 13), each of the angular regions having an origin at the center of the pointer 210 and aimed towards its respective selection target associated with the answer choice. In the first embodiment, the vertex angle 1312 at each FASR vertex is the same, and is approximately 30 degrees in the embodiment shown for all factions at all time steps, while the orientation of each FASR is uniquely determined at each time step based upon the updated position of the pointer 210.

In the next determine FASR users step 1204, the CCS 102 determines, for each FASR, which magnet icons 306 are located within the FASR. The definition of "within" may vary. In the present invention, the magnet icon 306 is defined to be within the FASR when a centerline of the icon falls within the edges of the FASR. The number of magnet icons 306 within each FASR, as well as the total number of magnet icons 306 associated with the FASR.

Magnet icons 306 are used in the examples shown, but it will be understood that any suitable type of icon or other location indicator may be used.

Thus with respect to the first time step target area 900 at time=0 of FIG. 13, the CCS 102 software counts 1 user in Faction 1, for there is one magnet icon 306 (corresponding to the User Intent Vector of one single user) in the first FASR 1300 at that time step. Similarly, the CCS 102 software counts 1 user in Faction 3 (the third FASR 1304), and 1 user in Faction 5 (the fifth FASR 1308), for there is one magnet icon 306 (corresponding to the User Intent vector of one single user) in each of those FASR regions 1304, 1308 as well. Note, in time step 0, there are three magnet icons 306 that have a portion overlapping the fifth FASR 1308, but the CCS 102 only counts one user in that the fifth FASR 1308. That's because the magnet icons 306 are a visual representation of a vector. In the present example, the vector angle of the magnet icon 306 (i.e. the centerline) must fall within the limits of the FASR to be counted. Thus, for those magnet icons 306 whose center line do not fall in one FASR, the corresponding directional user input vectors also do not fall within the FASR. Looking at the sixth FASR 1310, the CCS 102 software counts 2 users in Faction 6 associated with the answer choice 208 "6". That's because two magnet icons 306 shown have their centerline within the limits of the sixth FASR 1310.

In this way, the CCS 102 software counts the number of users in each of the six factions at time step 0.

In the last next time-step step 1206, the next time step is reached and the process returns to the pointer location step, where the pointer location is recalculated. The CCS 102 software is configured to repeat this method at each of a plurality of time steps. In most embodiments, time steps are every half-second, but in a preferred embodiment, the CCS 102 software uses time steps equal to a quarter second. Thus, four times per second, across the decision period, the CCS 102 software determines the number of users present in each of the plurality of factions based upon the User Intent Vectors for all users during that time-step, and the recomputed FASRs for that time step. A time-history of faction counts is stored by the CCS 102 software, indicating for each time step the number of users in each faction.

Having described the process by which the CCS 102 software defines and represents the FASRs at each time-step during the decision period, we can now describe how these FASRs are used in the faction analysis. More specifically, for each time step during the decision period, the CCS 102 software is configured to count the number of users who are pulling on the puck 210 with a User Intent Vector that falls inside the boundaries of the angular range defined by the FASR indexed with each answer choice 208.

During the decision period, the puck 210 moves under collective control. As it does, the FASRs 1300, 1302, 1304, 1306, 1308, 1310 are recomputed by the CCS 102 software, adjusting the origin of each FASR 1300, 1302, 1304, 1306, 1308, 1310 to the updated center location of the puck 210, and updating the orientation of each such that it continues to point at its respective selection target 902, 904, 906, 908, 910, 912. Thus, referring to second time step target area 1000 of FIG. 13, we see that after six seconds the puck 210 has moved to the new location. Consequently, the origin and orientation of each FASR 1300, 1302, 1304, 1306, 1308, 1310 has been recomputed by the CCS 102 software.

Looking at the second time step target area 1000 of FIG. 13 we see another time-step during the decision period, this time step corresponding to an elapsed time of 6 seconds into the decision process. At this second time step target area 1000, we see the magnet icons 306 (and thus the User Intent Vectors) have moved for the plurality of users. We also see that the FASRs 1300, 1302, 1304, 1306, 1308, 1310 have changed their positions and orientations, resulting from the new position of the pointer 210. The CCS 102 software is configured to determine faction counts for this new configuration. In this example, the CCS 102 software would count 0 users in the sixth FASR 1310 corresponding to the faction associated with answer choice 208 "6", because there are no longer any magnet icons 306 (or corresponding User Intent Vectors) within the sixth FASR 1310 indexed to answer choice 208 "6" at that time step. In this way, all the factions are updated and added to the aforementioned time-history of faction counts for this decision.

During the second time step the CCS 102 software counts 7 magnet icons 306 (corresponding to seven distinct User Intent Vectors) that fall within the fourth FASR 1306 indexed to answer choice 208 "4". This indicates that seven users are pulling towards answer choice 208 "4" at the second time-step, joining forces. Thus the time-history of the faction counts indicate the formation of a strong faction pulling for answer choice 208 "4", while also showing other factions losing support over time. This is valuable data that is stored.

Referring next to the third time step target area 1100 of FIG. 13, we see that after twelve seconds the pointer 210 has moved to another new location, which seems to be converging on the selection target 908 associated with answer choice 208 "4". Consequently, the origin and orientation of each FASR 1300, 1302, 1304, 1306, 1308, 1310 has been recomputed by the CCS 102 software yet again by the method described in FIG. 12. Referring to the fifth FASR 1308, the FIG. 13 depicts the new fifth FASR 1308 origin and orientation as defined by CCS 102 software for the given time-step. Of course, there are many intervening time steps, at each of which the CCS 102 software re-computes the origin and orientation of all six FASRs 1300, 1302, 1304, 1306, 1308, 1310.

Unfortunately, we see that this method is prone to analysis errors, incorrectly estimating the number of users pulling towards an answer choice 208 as the puck 210 gets close to that answer choice 208. In this frame, there are 9 magnet icons 306 pulling towards answer choice 208 "4", but only 4 magnets fall within the defined fourth FASR 1306 region associated with answer choice 208 "4" as defined by the corresponding User Intent Vectors. The fourth FASR 1306 spans the same angular area, but because the pointer 210 is close to the fourth selection target 908, the method is being less inclusive. This is a problem because human users adapt their strategy as the puck 210 nears an answer choice, widening the angle of pull. When a puck is far from an answer choice, human users tend to pull in an angle that is aimed at the answer choice within a narrow band, but as the puck approaches the answer choice, human users tend to widen the band they are pulling within even though their intent is still to get the puck to that answer choice. Because of this variability in human user angular alignment, an enhanced method is required to count factions which addresses the unique behavior of human users.

Referring next to FIG. 14, the first time step target area 900, the second time step target area 1000, and the third time step target area 1100 of FIGS. 9-11 are shown including FASRs 1300, 1302, 1304, 1306, 1308, 1310 during time steps of the decision process in accordance with a second embodiment of the method of faction determination of FIG. 12.

The time step target areas 900, 1000, 1100 of FIG. 14 represent an enhanced method of Faction Analysis. The embodiment still uses the method of FIG. 12, with FASRs and faction membership determined by the CCS 102 software, with each FASR updated at each time step such that the FASR origin corresponds to the center of the puck 210 and the orientation of each FASR aims at a corresponding answer choice 208 at that time-step. The counting process is also the same, such that at each time step, the CCS 102 software counts the number of users whose User Intent Vector (i.e. the centerline of the magnet icon) falls within each FASR, counting the users as contributors to a corresponding faction. The difference of the second embodiment is that the vertex angle 1312 of each FASR is not fixed as in the first embodiment, but is varied by the CCS 102 software during the decision period based on the proximity of the pointer 210 to the corresponding answer choice 208. More specifically, the FASR associated with the selection target (and therefore the associated answer choice 208) is increased in angular size (i.e. the vertex angle 1312 is increased) by the CCS 102 software as the pointer 210 approaches that particular selection target. Similarly, the FASR associated with one answer choice 208 is decreased in angular size (i.e. the vertex angle 1312 is decreased) by the CCS 102 software as the pointer 210 moves away from that particular answer choice 208. Thus the CCS 102 software is configured, at each time step, to compute the distance between the center of the puck 210 and each of the selection targets, and adjust the vertex angle 1312 of the FASR associated with the selection target/answer choice 208 based on the distance to that answer choice 208. One specific vertex calculation function is described below in FIGS. 15 and 16.

As shown in FIG. 14, the decision process of FIGS. 9-11 (and of FIG. 13) is again illustrated. However, the FASRs 1300, 1302, 1304, 1306, 1308, 1310 are determined using the second embodiment of the method of FIG. 12.

In the first time step target area 900, the pointer 210 is at the start position, by definition equidistant from each answer choice. Therefore, each FASR vertex angle 1312 is the same, as shown in the first time step target area 900.

In the second time step target area 1000 of FIG. 14, the pointer 210 has been moved by the collective input to the location closer to the fourth selection target 908 corresponding to answer choice 208 "4". The distance between the pointer 210 and the third selection target 906, the fourth selection target 908, and the fifth selection target 910 has decreased, and as a result the vertex angles 1312 for the third FASR 1304, the fourth FASR 1306, and the fifth FASR 1308 have widened. The distance between the pointer 210 and the first selection target 902, the second selection target 904, and the sixth selection target 912 has increased, and as a result the vertex angles 1312 for the first FASR 1300, the second FASR 1302, and the sixth FASR 1310 have narrowed.

In the third time step target area 1100 of FIG. 14, the pointer 210 has been moved by the collective input to the location even closer to the fourth selection target 908, nearly selecting the target 908. The distance between the pointer 210 and the fourth selection target 908 has decreased further, and as a result the vertex angle 1312 for the fourth FASR 1306 has widened compared to the second time step target area 1000. The distance between the pointer 210 and the first selection target 902, the second selection target 904, the third selection target 906, the fifth selection target 910, and the sixth selection target 912 has increased, and as a result the vertex angles 1312 for the first FASR 1300, the second FASR 1302, the third FASR 1304, the fifth FASR 1308, and the sixth FASR 1310 have narrowed compared to the second time step target area 1000. As a result, the vertex angles 1312 of the third FASR 1304 and the fifth FASR 1308 are similar to the original vertex angles 1312 at the first time step. The vertex angles 1312 of the first FASR 1300, the second FASR 1302, and the sixth FASR 1310 narrowed over both time steps, and are generally narrower than at the first time step.

As shown in FIG. 14, the widening of the fourth FASR 1306 vertex angle 1312 as the pointer 210 approaches the fourth selection target 908 allows a more accurate accounting of the number of users exerting influence in the direction of answer choice 208 "4". While as shown in FIG. 13 only four of the nine magnet icons 306 pulling on the pointer 210 are included in the fourth FASR 1306, using the second embodiment approximately 8 of the 9 magnet icons 306 are included in the fourth FASR 1306.

Figure 15:
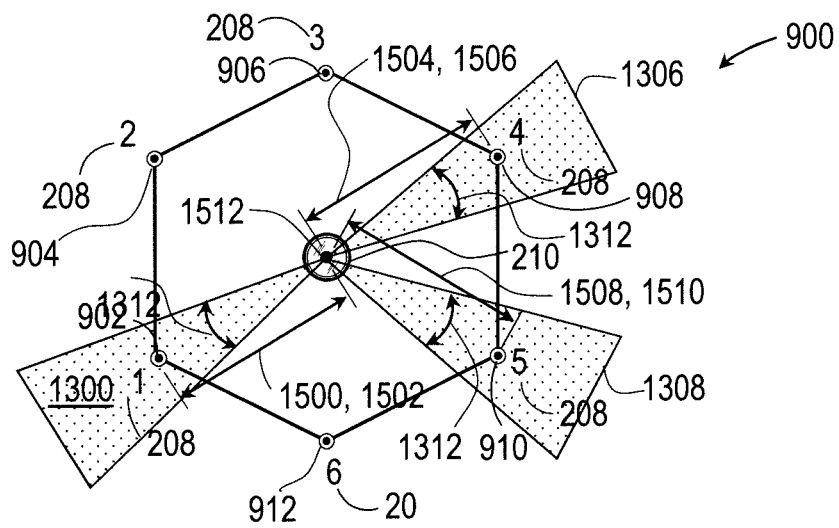
FIG. 15 is a spatial region diagram of a portion of the first time step target area as shown in accordance with the second embodiment of the method of FIG. 12.
Figure 16:
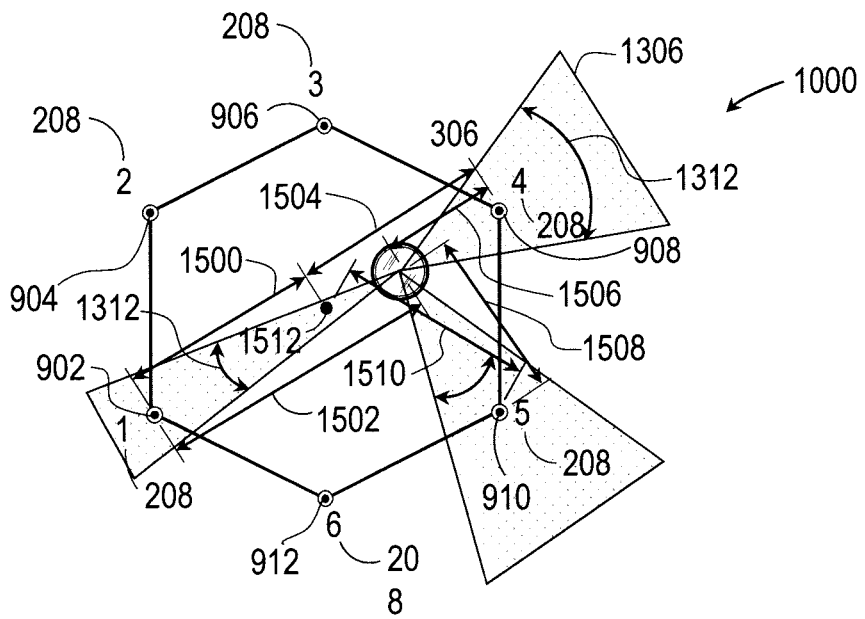
FIG. 16 is a spatial region diagram of a portion of the second time step target area as shown in accordance with the second embodiment of the method of FIG. 12.

Referring next to FIGS. 15 and 16, spatial region (FASR) diagrams of a portion of the first time step target area 900 and the second time step target area 1000 are shown for the second embodiment of the method of FIG. 12. Only the first FASR 1300, the fourth FASR 1306, and the fifth FASR are for clarity. Also shown are a first FASR starting distance 1500, a first FASR current distance 1502, a fourth FASR starting distance 1504, a fourth FASR current distance 1506, a fifth FASR starting distance 1508, a fifth FASR current distance 1510, and a target center 1512.

In the embodiment shown, the enhanced second embodiment FASR calculation is as follows for each FASR corresponding to one answer choice 208. The following values are defined:

Direction=the vector from the center of the pointer to the center of the selection target.

Starting Distance (S)=distance from center of the pointer to center of selection target at start time.

Current Distance (C)=distance from center of pointer to center of selection target at current time step.

The vertex angle (1312 angular size) of each FASR is then calculated as:

$$\text{Vertex angle}=20°+40°*S/(5*C)<60°$$

In the present embodiment the vertex angle 1312 is defined as having a maximum value not to exceed 60 degrees.

In this way, as at the start time S=C, the vertex angle 1312 starts at 20°+40°/(5)=28 Degrees for all FASRs. This is because at time step 0, the starting distance is the same as the current distance.

As shown in FIG. 15, at the first time step target area 900 equal to the decision process start time, each starting distance S 1500, 1504, 1508 equals the corresponding current distance C 1502, 1506, 1510, and the vertex angles 1312 are all the same (28 degrees using the present formula). Then, as shown in the second time step target area 1000 illustrated by FIG. 16, the pointer 210 has moved away from the first selection target 902, closer to the fifth selection target 910, and even closer to the fourth selection target 908. Thus, the current distances 1502, 1506, 1510 are as shown on FIG. 16, with the first FASR current distance 1502 longer than the first FASR starting distance 1500, the fourth FASR current distance 1506 shorter than the fourth FASR starting distance 1504, and the fifth FASR current distance 1510 also shorter than the fifth FASR starting distance 1508. These current distances 1502, 1506, 1510, when input into the formula, result in the smaller vertex angle 1312 for the first FASR 1300 and the larger vertex angles 1312 for the fourth FASR 1306 and the fifth FASR 1308.

As shown in FIGS. 15 and 16, when the pointer 210 moves away from a particular selection target, the angular region (vertex angle 1312) of the FASR that's associated with that answer choice will decrease linearly as the current distance grows. The angular size will drop from the staring angle of 28 degrees, linearly approaching 20 degrees as the distance rises. How close it gets to 20 degrees depends on the size of the FASR involved. This unique processing by the CCS 102 software accounts for the fact that human users express their intent with more angular precision as the target gets further away, thus falling within a narrower band when expressing an intent for a particular target. Without this processing, the CCS 102 software might include a user in a faction that does not correspond with his or her actual intent.

Conversely, the CCS 102 software is configured such that as the puck 210 moves towards a particular selection target, the angular region (vertex angle 1312) of the FASR associated with that selection target will grow linearly as the current distance shrinks. The angular size will grow from the starting angle of 28 degrees, getting larger and larger as the distance shrinks, until the value is capped at 60 degrees by the CCS 102 software (as mentioned above). Note, in some embodiments, the cap could be higher than 60 degrees. The intent of the cap is to avoid overlap of FASR regions which would be indeterminate. Also, while a linear relation is used herein, other relations between distance and angular size may be employed. Also, if a linear relation is used, other slopes may be used for that relation. This unique processing by the CCS 102 software accounts for the fact that human users express their intent with less angular precision as the target gets closer, thus falling within a wider band when expressing an intent for a particular target. Without this processing, the CCS 102 software might fail to include a user in a faction that corresponds with his or her actual intent.

In some embodiment the relationship between the distance and angular size is non-linear, the profile crafted to more accurately match human behavioral tendencies when pulling towards one target. More specifically, the range of possible angles used by users when pulling towards the target expands particularly rapidly when the pointer gets very close to the target. This can inventively be modeled as a power function where the angle size increases proportional to the distance raised to the −1.3 power.

Using the method embodiments described with respect to FIGS. 12-16, the CCS 102 software determines the number of users pulling towards each of the plurality of selection targets (corresponding to answer choices 208) at each of the plurality of time-steps across the decision period, the users pulling towards the same selection target being classified as being in the same "faction". This faction analysis results in a time-history of data stored by the CCS 102 software, documenting the number of users present in each of the plurality of factions at each of the plurality of time-steps across a decision period. This is referred to as a "user-count" based Faction Analysis.

In some embodiments, the CCS 102 software is configured to count not merely the presence or absence of a user within a faction, but also account for the relative magnitudes of the "pull" of each user. The magnitude of the pull of each user at each time-step is indicated by the magnitude of the user intent vector at that moment in time. Thus, instead of only counting the number of user intent vectors that fall within a particular FASR at a particular time-step, the CCS 102 software can be configured to sum the magnitudes of the force magnitudes associated with the user intent vectors that fall into a particular faction at a particular moment in time. This is referred to herein as a "force summation" based Faction Analysis.

For clarity, a "force summation" based Faction Analysis as described herein records a time-history of the total force applied to the puck 210 that is identified as being aimed towards one particular answer choice 208, for each of the plurality of answer choices 208, during a decision period of a collective intelligence. It should be noted that the total force across all factions is not necessarily the same as the total force on the puck 210, for some users pull between factions, their intent not aimed at any particular answer at a moment in time. These are users who are pulling in the areas between FASRs. In some embodiments, the total force applied between factions is also summed and tracked across time steps. In some such embodiments, the count of users between factions and/or the summation of user force between factions is used to indicate an intention of users to "defend against" an answer choice 208 the puck 210 is heading towards, such a defense not being associated with a particular alternative answer. It is often the case that users vary their strategy during a collective intelligence decision, varying between defending against answer choices, pulling towards answer choices, and doing both at the same time. Thus storing a time history of faction pulls and between faction pulls has unique and inventive value when assessing the decision process of a collective intelligence.

Figure 17:
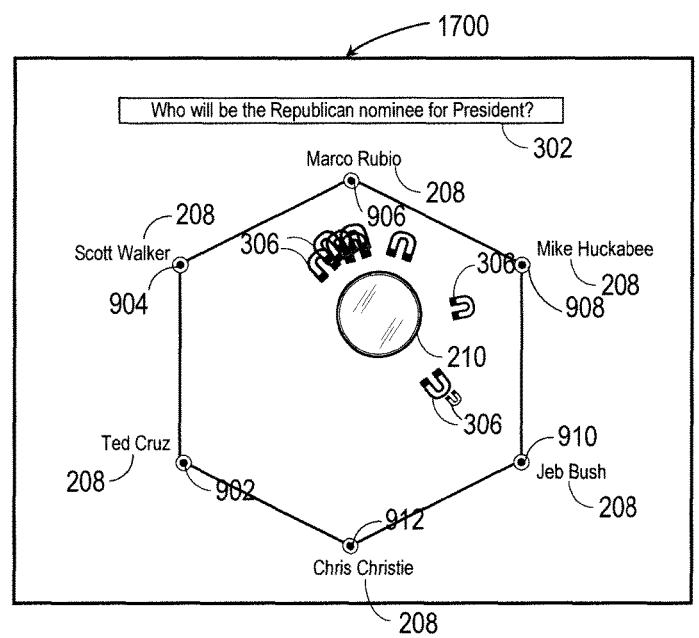
FIG. 17 is a snapshot of an exemplary target area during an exemplary collective intelligence decision process.

Referring next to FIG. 17, a snapshot of an exemplary target area 1700 during a collective intelligence decision process is shown. Shown are the question display 302, the plurality of answer choices 208, the plurality of selection targets 902, 904, 906, 908, 910, 912, the pointer 210, and the plurality of magnet icons 306.

As depicted in FIG. 17, a collective intelligence was asked "Who will be the Republican Nominee for President?" This is a textual prompt that appeared in substantial simultaneity upon the local computer screens of the plurality of users participating in the collective decision process. This textual prompt was conveyed to each of the plurality of local computers as part of the exchanges of data 106 over the communication link, from the CCS 102. Also conveyed from the CCS 102 to the plurality of computing devices 104 is the plurality of answer choices 208, each answer choice associated with one selection target 902, 904, 906, 908, 910, 912. In this example, the answer choices 208 were: Ted Cruz, Scott Walker, Marco Rubio, Mike Huckabee, Jeb Bush, and Chris Christie. These choices 208 were thus displayed in substantial simultaneity on the local computing devices 104 of the plurality of users. In this embodiment, the choices 208 are displayed around a hexagon as shown in the figure. Also displayed on the local computing devices 104 of the plurality of users is the collaboratively controlled puck 210, the relative placement of the puck 210 with respect to the choices 208 appearing in substantial simultaneity on the screens of all users, thus creating a synchronous experience. Each user then controls the graphical magnet icon 306 to convey the real-time user intent vector. The CCS 102 controls the motion of the puck 210 based on the collective input impacted as real-time user intent vectors, repeatedly collected across time steps. In this way, the puck 210 is collectively controlled across the decision period, moved from a starting position to the final target selection by the plurality of users working together in real-time as a unified dynamic system.

In this example, the users ultimately collectively selected the answer choice "Jeb Bush" associated with the fifth selection target 910. That said, the puck 210 took a complex path, first approaching the third selection target 906 associated with Marco Rubio, almost landing upon it, but then reversing direction, and landing on the fifth selection target 910 associated with "Jeb Bush". To understand how the collective intelligence produced such a decision, and why the puck 210 took this complex path, it is highly valuable to perform the inventive Faction Analysis process described herein. As described, the CCS 102 (or related subset of software) is configured to determine which of the six answer choices 208 each user is pulling towards, at each time step during the decision process, or if any users are not pulling towards any faction. In this case the six factions correspond with the six candidate names, which are the set of possible answers presented to the collective intelligence. The faction analysis data thus describes in an efficient and understandable way, how user factions form and change and sometimes dissolve across the decision period, as users in the collective negotiate in real-time as a unified dynamic system. This numerical data is extremely valuable to understand the collective intelligence process.

Figure 18:
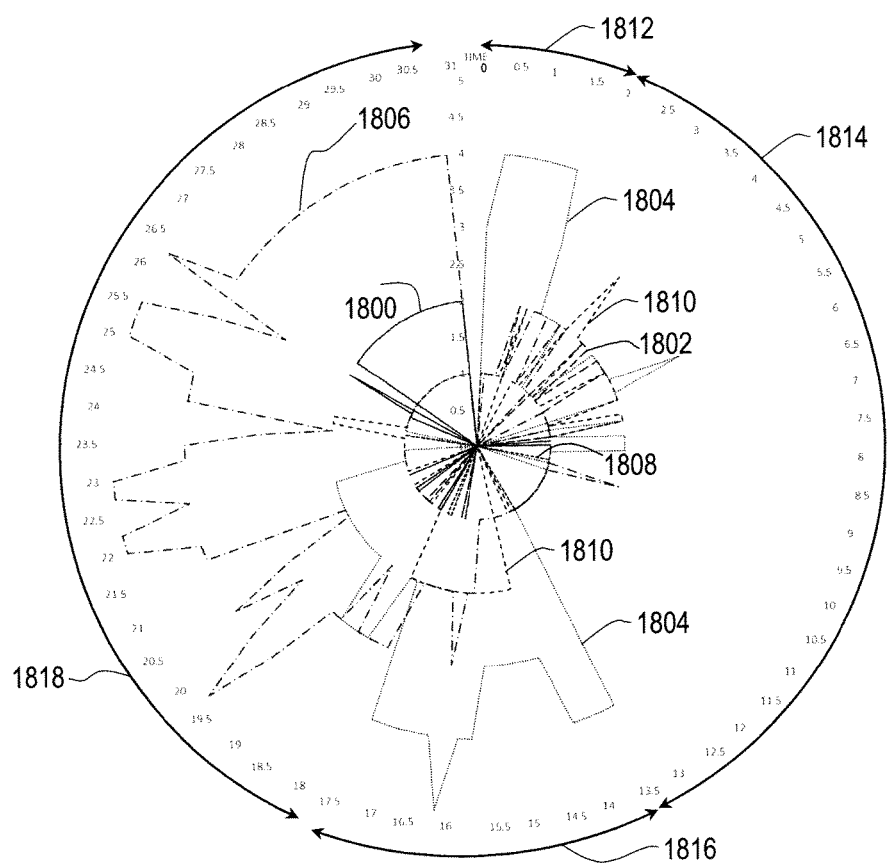
FIG. 18 is an exemplary time-history plot depicting a time-history of faction data across the decision period of the collective intelligence decision of FIG. 17.

To make the data even more valuable, methods have been developed to visualize the numerical data in a graphical form. Referring next to FIG. 18, an example time-history plot is shown that depicts the time-history of faction data across the decision period associated with the question of FIG. 17. Shown are a Ted Cruz faction data line 1800, a Scott Walker faction data line 1802, a Marco Rubio faction data line 1804, a Jeb Bush data line 1806, a Mike Huckabee data line 1808, and a Chris Christie data line 1810.

FIG. 17 shows a radial plot that starts at the top (i.e. at twelve o'clock) at 0 seconds, then proceeds clockwise around the circle, conveying a full decision period that lasts approximately 30 seconds. The radial height of each data line 1800, 1802, 1804, 1806, 1808, 1810 plotted on the chart indicates how many users are included in each faction at the given time. As the data lines 1800, 1802, 1804, 1806, 1808, 1810 continue around the radial plot, the plot shows, using a different linetype for each faction, the number of users present in each of the factions over time. Thus the height of each data line 1800, 1802, 1804, 1806, 1808, 1810 shows the number of users present in the faction associated with that line 1800, 1802, 1804, 1806, 1808, 1810. The key on the chart shows which linetype is associated with each candidate faction.

Referring again to FIG. 18 in detail, we can look first at time-step 0 (at the top of the graph) and refer to the key on the side of the graph which shows which linetype corresponds to which candidate faction (as represented by data lines 1800, 1802, 1804, 1806, 1808, 1810). At a first time period 1812 between time step 0 and time step 2.0 seconds, a large faction was recorded and plotted corresponding to a pull towards Marco Rubio, as shown by the greater height of the Marco Rubio data line 1804. The Marco Rubio faction was strong but was not able to get the puck 210 onto the selection target. The Marco Rubio faction then dissolved into a period of negotiation, users pulling towards many answer choices 208. This is seen on the graph during a second time period 1814 between time period 2.0 seconds and time period 13.5 seconds. Then, a faction forms again pulling towards Marco Rubio. During a third time period 1816, they make another attempt but again can't get the puck 210 onto the selection target. This is between time step 13.5 seconds and 17.5 seconds. During that period, a strong faction is also plotted pulling towards Chris Christie as shown by the increase in the height of the Chris Christie data line 1810 at around 14.5 seconds. Thus, we can see that the Chris Christie faction was the primary barrier against Marco Rubio faction pulling the puck 210 to the target. After another failed attempt to get the puck 210 to the Marco Rubio answer choice, a new faction forms for Jeb Bush that is very intense. As shown on the fourth time period 1818 of the plot (between about 18 and 30 seconds), the height of the Jeb Bush data line 1806 peaks at 5 users, all pulling together towards Jeb Bush. In this example, the users were able to get the puck 210 onto the Jeb Bush associated answer choice 208. Thus the collective intelligence was able to find common ground, converging on Jeb Bush as the answer. This occurred after a period of negotiation in which factions formed and dissolved in real-time, as the users pulled as a collective. The faction analysis data, and associated plot, makes this decision process far more valuable and understandable than just looking at the resulting motion of the puck 210. Thus, the inventive process of faction analysis described herein provides new and important insights into the decision process of a plurality of users making decisions as a real-time collective intelligence.

The present invention also includes a method for quantifying the behavior of each of the plurality of users based on the faction analysis data. More specifically, the present invention is configured such that the time-history of faction data records which user was present in which faction at each time step. This is achieved by the CCS 102 storing a unique user identifier for each of the plurality of users and associating that identifier with the data stored in the faction time history. In this way, the CCS 102 stores an indication of which user was present in which faction at each time step during the decision period and if so, how many times they changed. This data can be processed on a per-user basis, determining if that user changed factions during the decision period. If a user did not change factions at all during the decision period, that user is classified as "entrenched" by the CCS 102 software process. If the user changed factions a small number of times during the decision process (i.e. the number of times the user changed factions is between an upper limit and a lower limit), for example between two and four times, that user is classified as "flexible" by the CCS 102 software process. And if the user changed factions a large number of times (i.e. the number of times the user changed factions is larger than an upper limit), for example, five or more times during the decision process, that user is classified as "fickle" by the CCS 102 software process. In this way participants in a real-time collective intelligence can be assessed based on the number of times they changed factions during a real-time collective decision process. In some embodiments the user is classified based on a number of different factions the user "pulled" towards during the decision process (where "pulling" is the action of the user causing the user intent vector to be directed towards a target associated with the faction). The user can thereby be deemed "entrenched" when the number of different factions "pulled" towards is equal to one, i.e. the target chosen by the user does not change during the decision process.

In some embodiments, users are awarded points or credits for being classified as flexible, but awarded less points or credits (or no points or credits) if classified as entrenched or fickle. In other embodiments, users who are classified by the CCS 102 software as entrenched and/or fickle lose points or credits. This encourages effective decision making as a unified intelligence.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for faction analysis for a collaboration system including a plurality of individual computing devices and a collaboration server exchanging data with each of the plurality of computing devices, whereby a group of individual users is enabled to participate in a decision process including the real-time collaborative control of a graphical object and a plurality of selection targets, each user of the group of individual users associated with and interacting with one of the individual computing devices, the collaboration system performing the steps of:

receiving, from each of the computing devices at multiple time steps of the decision process, at least one real-time user intent value reflecting the associated individual user's current user input regarding a desired motion of the graphical object, whereby a current location and orientation of a user icon associated with the user is updated on a display of the computing device of the associated user;

determining, for multiple time steps, a current location, on the display, of the graphical object based at least in part upon the plurality of real-time user intent values received from the plurality of computing devices;

determining, for multiple time steps, one spatial region associated with each selection target, wherein each spatial region is determined based at least in part on the current location of the graphical object and each spatial region is a region bounded by an angle having an angle vertex located at a center of the current location of the graphical object, wherein the angle is centered on the selection target associated with the spatial region, wherein the size of each spatial region angle is determined by the proximity of the current location of the graphical object to the selection target associated with the selection target, and wherein the closer the proximity of the graphical object to the selection target, the larger the size of the spatial region angle associated with that selection target;

determining, for multiple time steps and for each user, if the user icon is associated with one spatial region; and assigning, for multiple time steps, for each user icon at least partially present within a boundary of one spatial region, of the user to a faction associated with the spatial region associated with the selection target.

2. A method for faction analysis for a collaboration system including a plurality of individual computing devices and a collaboration server exchanging data with each of the plurality of computing devices, whereby a group of individual users is enabled to participate in a decision process including the real-time collaborative control of a graphical object and a plurality of selection targets, each user of the group of individual users associated with and interacting with one of the individual computing devices, the collaboration system performing the steps of:

receiving, from each of the computing devices at multiple time steps of the decision process, at least one real-time user intent value reflecting the associated individual user's current user input regarding a desired motion of the graphical object, whereby a current location and orientation of a user icon associated with the user is updated on a display of the computing device of the associated user; determining, for multiple time steps, a current location, on the display, of the graphical object based at least in part upon the plurality of real-time user intent values received from the plurality of computing devices, determining, for multiple time steps, one spatial region associated with each selection target, wherein each spatial region is determined based at least in part on the current location of the graphical object and each spatial region is a region bounded by an angle having an angle vertex located at a center of the current location of the graphical object, wherein the angle is centered on the selection target associated with the spatial region, wherein the size of each spatial region angle is determined by the proximity of the current location of the graphical object to the selection target associated with the selection target, the step of determining the spatial regions further comprising determining, for multiple time steps, a current distance for each spatial region, wherein the current distance for each selection is a distance from the center of the graphical object at a current time step to a center of the selection target, determining, for multiple time steps and for each user, if the user icon is associated with one spatial region; and assigning, for multiple time steps, for each user icon at least partially present within a boundary of one spatial region, of the user to a faction associated with the spatial region associated with the selection target.

3. The method for faction analysis of claim 2, the step of determining the spatial regions further comprising the step of:

calculating according to a formula, for multiple time steps, the size of each spatial region angle based on the current distance.

4. The method for faction analysis of claim 3, wherein the formula results in increasing the spatial region angle size as the current distance decreases.

5. The method for faction analysis of claim 4, wherein the angle size is limited to less than a maximum angle size.

6. A method for faction analysis for a collaboration system including a plurality of individual computing devices and a collaboration server exchanging data with each of the plurality of computing devices, whereby a group of individual users is enabled to participate in a decision process including the real-time collaborative control of a graphical object and a plurality of selection targets, each user of the group of individual users associated with and interacting with one of the individual computing devices, the collaboration system performing the steps of:

receiving, from each of the computing devices at multiple time steps of the decision process, at least one real-time user intent value reflecting the associated individual user's current user input regarding a desired motion of the graphical object, whereby a current location and orientation of a user icon associated with the user is updated on a display of the computing device of the associated user;

determining, for multiple time steps, a current location, on the display, of the graphical object based at least in part upon the plurality of real-time user intent values received from the plurality of computing devices;

determining, for multiple time steps, one spatial region associated with each selection target, wherein each spatial region is determined based at least in part on the current location of the graphical object;

determining, for multiple time steps and for each user, if the user icon is associated with one spatial region;

assigning, for multiple time steps, for each user icon at least partially present within a boundary of one spatial region, of the user to a faction associated with the spatial region associated with the selection target;

determining and storing, for at least one user, a number of times the faction assignment for each user changes during a decision period determining and storing, for each at least one user, a number of factions each user "pulled" towards during the decision period; and determining a user assessment value for the at least one user based on at least one of the number of factions each user "pulled" towards during the decision period, and the number of times the faction assignment changed during the decision period.

7. The method for faction analysis of claim 6, further comprising the step of determining, for at least one user, whether the user is entrenched, wherein the user is entrenched when the number of different factions the user "pulled" towards during the decision period was determined to be 1.

8. The method for faction analysis of claim 6, further comprising the step of determining, for at least one user, whether the user is flexible, wherein the user is flexible when the number of times the faction assignment for the user changed during the decision period was determined to be greater than a defined lower limit and less than a defined upper limit.

9. The method for faction analysis of claim 6, further comprising the step of determining, for at least one user, whether the user is fickle, wherein the user is fickle when the number of times the faction assignment for the user changed during the decision period was determined to be greater than a defined upper limit.

\* \* \* \* \*